US 8,561,741 B2

(12) United States Patent
Kurokawa et al.

(10) Patent No.: US 8,561,741 B2
(45) Date of Patent: Oct. 22, 2013

(54) AIR GUIDE DUCT STRUCTURE FOR VEHICLE

(75) Inventors: Hidetoshi Kurokawa, Wako (JP); Tadayuki Uchida, Wako (JP); Tomoaki Ichikawa, Wako (JP); Toshikatsu Mouri, Wako (JP); Hideki Miura, Wako (JP); Ryota Abe, Wako (JP); Takashi Aoki, Wako (JP); Ken Nakane, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 13/264,026

(22) PCT Filed: Mar. 16, 2010

(86) PCT No.: PCT/JP2010/054388
§ 371 (c)(1),
(2), (4) Date: Oct. 12, 2011

(87) PCT Pub. No.: WO2010/122857
PCT Pub. Date: Oct. 28, 2010

(65) Prior Publication Data
US 2012/0043051 A1    Feb. 23, 2012

(30) Foreign Application Priority Data

| Apr. 24, 2009 | (JP) | ................................ 2009-106054 |
| Apr. 24, 2009 | (JP) | ................................ 2009-106080 |
| Apr. 24, 2009 | (JP) | ................................ 2009-106098 |
| Apr. 24, 2009 | (JP) | ................................ 2009-106216 |

(51) Int. Cl.
*B60K 11/04* (2006.01)
(52) U.S. Cl.
USPC ................. 180/68.4; 180/68.6; 296/193.09

(58) Field of Classification Search
USPC ................. 180/68.1, 68.2, 68.3, 68.4, 68.6; 296/193.09, 193.1
See application file for complete search history.

(56) References Cited

U.S. PATENT DOCUMENTS

| 6,814,400 | B2 * | 11/2004 | Henderson et al. ...... 296/193.09 |
| 7,073,848 | B2 * | 7/2006 | Lee ............................ 296/193.09 |
| 7,410,018 | B2 * | 8/2008 | Satou ........................... 180/68.4 |

FOREIGN PATENT DOCUMENTS

| DE | 102006045421 | 4/2008 |
| JP | 10-175486 | 6/1998 |

(Continued)

OTHER PUBLICATIONS

Mechanical translation of JP 2008-157279, cited by Applicant.*

(Continued)

*Primary Examiner* — John Walters
(74) *Attorney, Agent, or Firm* — Rankin, Hill & Clark LLP

(57) ABSTRACT

An air guide structure for guiding outside air in front of the vehicle to equipment to be cooled. Ai air guide duct structure (20) is provided with: left and right side-wall ducts (46, 68) provided to the left and right sides of equipment (16) to be cooled; and left and right seal sections (47, 69) protruding from the inner wall surfaces (46a, 68a) of the left and right side-wall ducts toward the equipment (16) to be cooled. The left and right seal sections (47, 69) are spaced by a predetermined distance (S1) from the equipment (16) to be cooled toward the front of the vehicle body. Air pressure during the travel of the vehicle elastically deforms the right and left seal sections (47, 69) to cause the seal sections to make contact with the equipment (16) to be cooled.

11 Claims, 25 Drawing Sheets

(56) References Cited

FOREIGN PATENT DOCUMENTS

| | | |
|---|---|---|
| JP | 2001-206173 | 7/2001 |
| JP | 2003-306047 | 10/2003 |
| JP | 2004-521813 | 7/2004 |
| JP | 2004-249816 | 9/2004 |
| JP | 2005-096684 | 4/2005 |
| JP | 2007-015487 | 1/2007 |
| JP | 2007-245858 | 9/2007 |
| JP | 2008-049815 | 3/2008 |
| JP | 2008-155739 | 7/2008 |
| JP | 2008-157279 | 7/2008 |
| JP | 2008-260493 | 10/2008 |

OTHER PUBLICATIONS

Mechanical translation of JP 2007-245858, cited by Applicant.*

Mechanical translation of JP 2004-249816, cited by Applicant.*

* cited by examiner

FIG.12
(a)
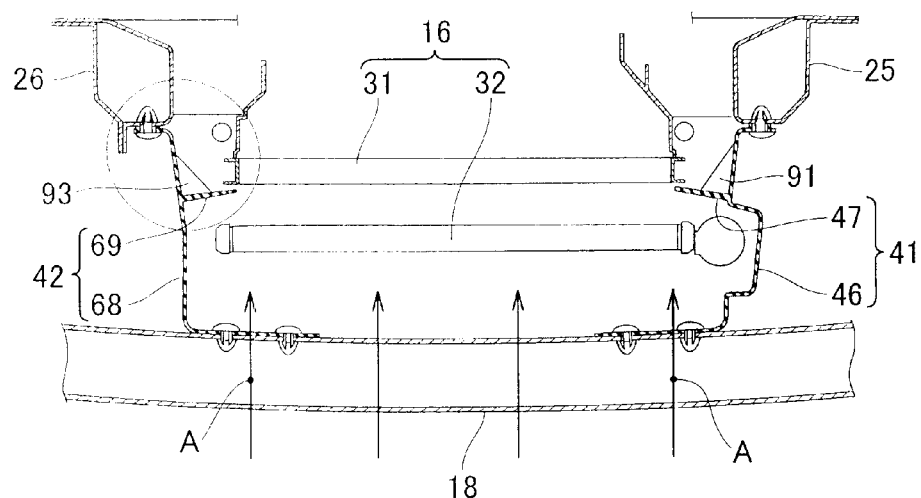
(b)
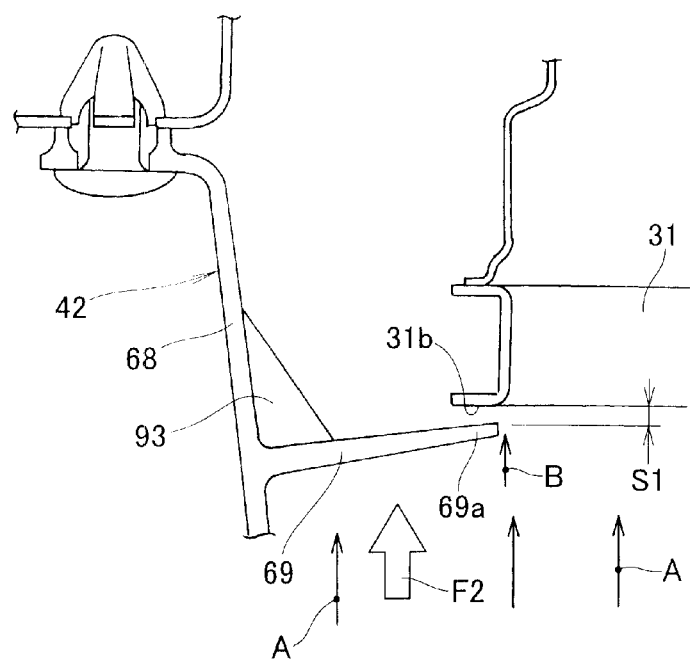

FIG.14
(a)
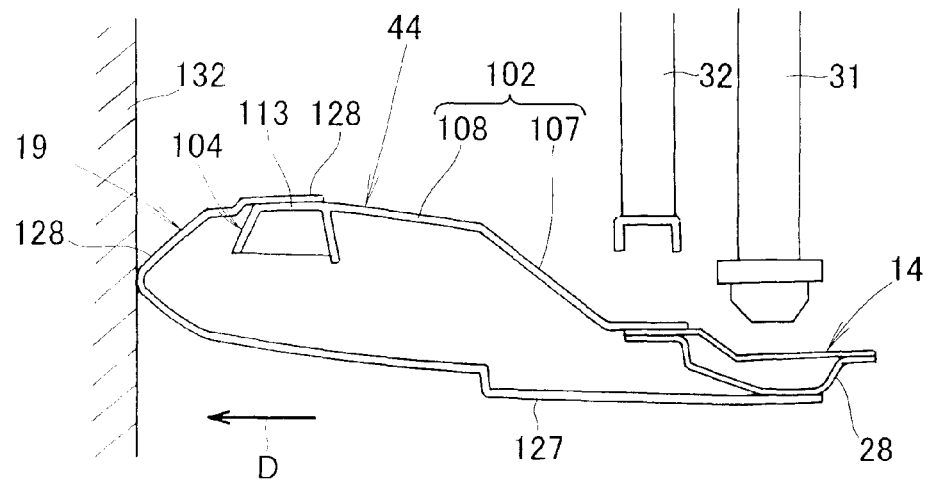
(b)
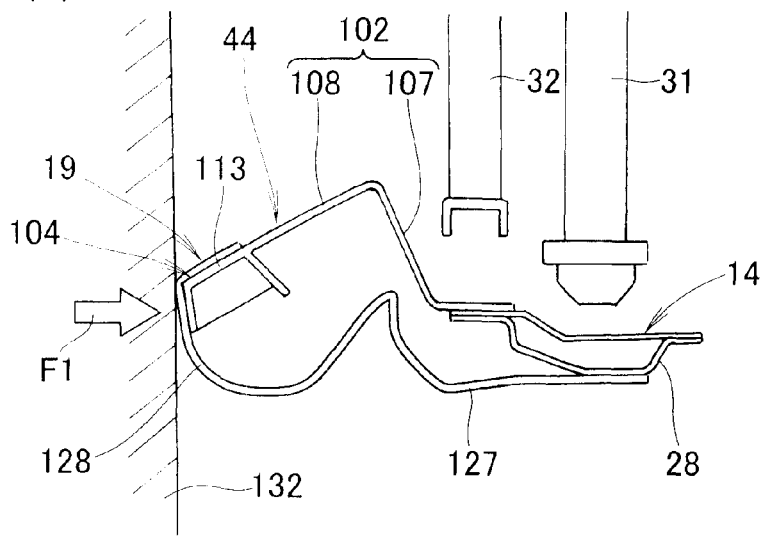

FIG.24
(a)
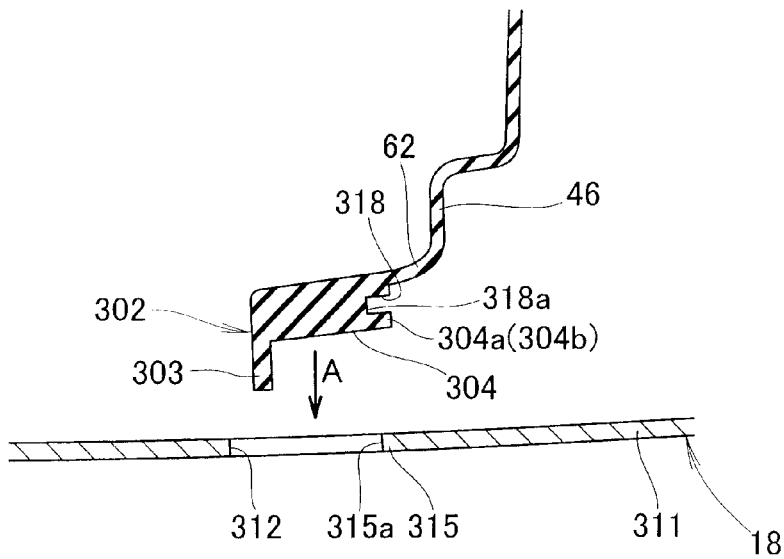
(b)
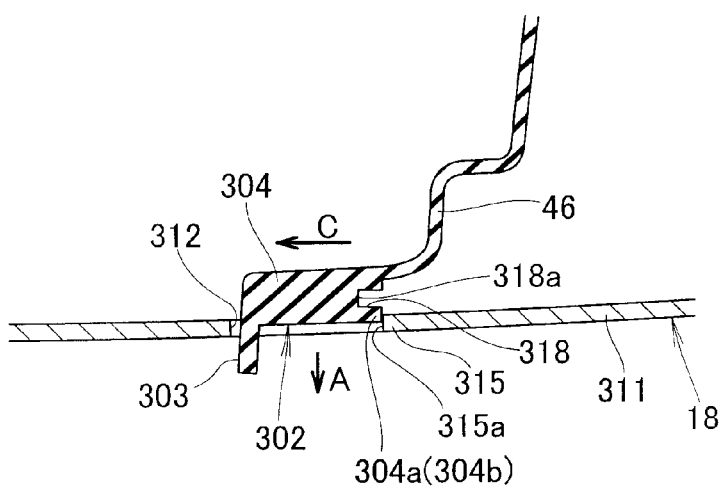
(c)
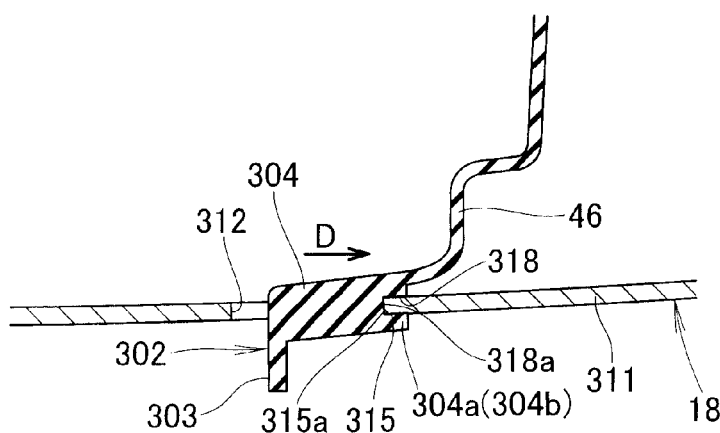

AIR GUIDE DUCT STRUCTURE FOR VEHICLE

TECHNICAL FIELD

The present invention relates to a vehicle air guide duct structure provided on the left and right sides of an equipment to be cooled for guiding outside air in front of the vehicle as cooling air (traveling air) to the equipment to be cooled.

BACKGROUND ART

In certain vehicle air guide duct structure, an equipment to be cooled (a radiator or the like) is housed within a case of a cooling apparatus, and air guide ducts (hereinbelow referred to as "side-wall ducts") are provided on the left and right sides of the case.

In the side-wall ducts described above, side-wall plate-shaped duct bodies are formed from a rubber material. Therefore, support parts for reinforcing the duct bodies are provided in order to ensure rigidity of the duct bodies.

According to the air guide duct structure described above, when the vehicle is traveling, air in front of the vehicle is guided as cooling air into the case through the left and right side-wall ducts, and the equipment to be cooled is cooled by the guided cooling air (see Patent Literature 1, for example).

The air guide duct structure disclosed in Patent Literature 1 is configured such that an equipment to be cooled is housed within a case, and cooling air is guided into the case by left and right side-wall ducts. However, when the left and ride sides of the equipment to be cooled are separated from the case inner surfaces, some of the cooling air guided into the case flows through the spaces between the equipment to be cooled and the case inner surfaces, and the cooling air cannot be efficiently guided to the equipment to be cooled.

PRIOR ART LITERATURE

Patent Literature

Patent Literature 1: Japanese Patent Application Laid-Open Publication No. 2007-15487

SUMMARY OF INVENTION

Technical Problem

An object of the present invention is to provide an air guide duct structure for a vehicle whereby cooling air can be efficiently guided to equipment to be cooled.

Solution to Problem

According to the present invention, there is provided a vehicle air guide duct structure comprising: left and right side-wall ducts provided on left and right sides of an equipment to be cooled and extending in a longitudinal direction of a vehicle body for guiding air in front of the vehicle as cooling air to the equipment to be cooled; and elastically deformable left and right seal sections projecting outward from respective inner wall surfaces of the left and right side-wall ducts toward side-edge front surfaces of the equipment to be cooled, the seal sections extending up to the side-edge front surfaces while being separated by a predetermined distance from the side-edge front surfaces toward a front of the vehicle; wherein the seal sections undergo elastic deformation and come into contact with the side-edge front surfaces when subjected to a traveling air pressure while the vehicle is traveling.

Preferably, reinforcing left and right ribs connecting to the side-wall ducts are provided on front-wall surfaces or rear-wall surfaces of the seal sections.

Preferably, the side-wall ducts and the seal sections are formed from a rubber material.

Preferably, the side-wall ducts have: attachment flaps projecting in a direction substantially orthogonal to a direction in which the side-wall ducts extend; and interlocking parts provided on the attachment flaps, wherein the interlocking parts have longitudinal interlocking parts capable of interlocking with top and bottom areas of oblong holes provided on the sides of the vehicle body and extending in the vehicle width direction.

Preferably, the interlocking parts have transverse interlocking parts capable of interlocking with longitudinal end areas of the oblong holes.

Preferably, the transverse interlocking parts interlock with edges of the longitudinal end areas.

Preferably, the air guide duct structure further comprises: a top duct made of a hard resin and provided on a top side of the equipment to be cooled; and a bottom duct made of a hard resin and provided on a bottom side of the equipment to be cooled; wherein bottom end parts of the left and right side-wall ducts are both attached to the bottom duct.

Preferably, the left and right side-wall ducts have respective attachment flaps which are substantially orthogonal to the respective side walls of the left and right side-wall ducts; and both of the attachment flaps are attached to a front bumper beam.

Preferably, the bottom duct and the left and right side-wall ducts have attachment holes formed in the respective bottom end parts, and clips are fitted into each of the attachment holes, whereby the bottom end parts of the left and right side-wall ducts are attached to the bottom duct by the clips.

Preferably, the air guide duct structure is provided between a front bumper beam which supports a front bumper face and a front bulk head which supports the equipment to be cooled; the left and right side-wall ducts are composed of a rubber material extending in the longitudinal direction of the vehicle body; a bottom duct made of a hard resin is provided on a bottom side of the equipment to be cooled; and bottom end parts of the left and right side-wall ducts are both attached to the bottom duct.

Preferably, the bottom duct has a collision energy-absorbing structure for absorbing collision energy.

Preferably, the bottom duct comprises: a rear end part attached to the front bulk head; an inclined part which projects at an upward incline toward the front of the vehicle body from the rear end part; and a substantially horizontal part which projects toward the front of the vehicle body from the inclined part; wherein the inclined part and the horizontal part are made to have a low rigidity and thereby form the collision energy-absorbing structure; a front end part projects toward the front of the vehicle body from the horizontal part, the front end part being provided with reinforcing ribs and made to have a high rigidity; and the front bumper face is supported by the highly rigid front end part.

Advantageous Effects of Invention

In the present invention, air in front of the vehicle is guided as cooling air (traveling air) by the side-wall ducts to the equipment to be cooled. The seal sections project outwardly from the side-wall ducts, and the projecting seal sections are separated from the side-edge front surfaces by a predetermined distance toward the front of the vehicle body. When the vehicle is idling, the seal sections are kept separated from the side-edge front surfaces. The seal sections thereby do not affect the vibration characteristics of the equipment to be cooled during idling, and instances of, for example, the seal sections resonating and vibration increasing can be suppressed.

The seal sections are elastically deformable members. When the vehicle is traveling, the seal sections elastically deform and come into contact with the side-edge front surfaces by the traveling air pressure coming in from the front of the vehicle. By bringing the seal sections in contact with the side-edge front surfaces, the gaps (spaces) between the side-wall ducts and the side edges of the equipment to be cooled can be closed off by the seal sections. The cooling air (traveling air) guided to the equipment to be cooled by the side-wall ducts can thereby be efficiently guided to the equipment to be cooled.

In the present invention, reinforcing ribs that connect to the side-wall ducts are provided on the front wall surfaces or rear wall surfaces of the seal sections. The seal sections can be provided with suitable rigidity by the reinforcing ribs, and the precision of the seal sections can be increased.

Furthermore, in the present invention, the side-wall ducts and the seal sections are formed (molded) from a single rubber material. When the side-wall ducts are formed from a resin material and the seal sections are formed from a rubber material, the side-wall ducts and the seal sections must be molded by two-color molding.

However, the side-wall ducts and the seal sections can be molded without using two-color molding by forming the side-wall ducts and the seal sections from a single rubber material. The molding of the side-wall ducts and the seal sections is thereby made easier, and the cost of the side-wall ducts and seal sections can be kept low.

Furthermore, the seal sections can be made into softer members by being formed (molded) using a rubber material. There is thereby no risk of the equipment to be cooled (specifically, the side-edge front surfaces) being scratched by the seal sections when the seal sections elastically deform and come in contact with the side-edge front surfaces by the traveling air pressure.

In the present invention, interlocking parts are provided on the attachment flaps provided on the side-wall ducts, and longitudinal interlocking parts are provided on the interlocking parts. The longitudinal interlocking parts interlock with top and bottom areas of oblong holes in the sides of the vehicle body. By interlocking these longitudinal interlocking parts with the top and bottom areas of the oblong holes, the attachment flaps of the side-wall ducts can be attached to the sides of the vehicle body. Consequently, the incisions (the slits) that were conventionally formed in the side-wall ducts can be omitted from the side-wall ducts. Thereby, when air in front of the vehicle is guided as cooling air (traveling air) to the equipment to be cooled by the side-wall ducts, the cooling air can be inhibited from flowing out of the side-wall ducts through the incisions (the slits), and the cooling air guided to the equipment to be cooled by the side-wall ducts can be efficiently guided to the equipment to be cooled.

Furthermore, by providing the longitudinal interlocking parts integrally with the attachment flaps, the operating spaces can be kept smaller than in cases in which the attachment flaps are attached to the sides of the vehicle body using clips that are separate members from the attachment flaps, for example. The attachment flaps of the side-wall ducts can thereby be easily attached to the sides of the vehicle body even in the case of small operating spaces.

Furthermore, in the present invention, transverse interlocking parts are provided on the interlocking parts. By interlocking these transverse interlocking parts with the longitudinal end areas of the oblong holes, the attachment flaps of the side-wall ducts can be more reliably attached to the sides of the vehicle body.

Furthermore, in the present invention, the transverse interlocking parts are interlocked with the end edges (the longitudinal end areas) of the oblong holes. The transverse interlocking parts can thereby be firmly interlocked with the longitudinal end areas of the oblong holes, and the attachment flaps of the side-wall ducts can be more reliably attached to the sides of the vehicle body.

In the present invention, the air guide duct structure for a vehicle is divided into four ducts: the left and right side-wall ducts and the top and bottom ducts. The left and right side-wall ducts are formed from a rubber material, and the top and bottom ducts are formed from a hard resin material. By dividing the air guide duct structure for a vehicle four ways into the left and right side-wall ducts and the top and bottom ducts in this manner, the operation of attaching the air guide duct structure can be performed more easily. Furthermore, by forming the top and bottom ducts from a hard resin material, the top and bottom ducts are easier to handle than if they were formed from a rubber material, and the operation of attaching the air guide duct structure can be performed more easily.

Furthermore, by providing the bottom end parts of the left and right side-wall ducts to the bottom duct, the left and right side-wall ducts can be reinforced by the bottom duct and the rigidity of the left and right side-wall ducts can be increased. Specifically, the bottom duct can also be used as a reinforcing member of the left and right side-wall ducts. It is therefore possible to dispense with the support members, which have conventionally been needed in order to ensure rigidity in the left and right side-wall ducts. By providing the bottom end parts of the left and right side-wall ducts to the bottom duct in this manner, the rigidity of the side-wall ducts can be ensured and the need for reinforcing support members in the side-wall ducts can be eliminated.

Furthermore, since the hard resinous top duct is provided on the top side of the equipment to be cooled, the top duct can acts as an air-guiding surface. Air in front of the vehicle can thereby be guided as cooling air to the equipment to be cooled more satisfactorily by the top duct.

Additionally, by providing the hard resinous top duct to the top side of the equipment to be cooled, the front bulk head and the equipment to be cooled can be covered by the top duct. The front bulk head and the equipment to be cooled can thereby be hidden by the top duct when the engine hood is opened, and an attractive appearance can therefore be ensured, improving merchantability.

Furthermore, in the present invention, the side-wall ducts can be reinforced by the attachment flaps by providing the attachment flaps substantially orthogonal to the side-wall ducts. Additionally, the attachment flaps are provided on the front bumper beam. The side-wall ducts can thereby be reinforced by the front bumper beam and the rigidity of the side-wall ducts can be further increased.

Furthermore, in the present invention, attachment holes are provided on the bottom duct and the bottom end parts of the left and right side-wall ducts, and clips are fitted into the attachment holes to attach the bottom end parts of the left and right side-wall ducts to the bottom duct. The left and right side-wall ducts are softer members than the bottom duct due to being formed from a rubber material. Consequently, the attachment holes of the left and right side-wall ducts can easily be aligned with the attachment holes of the bottom duct. The operation of fitting the clips with the left and right side-wall ducts and the attachment holes of the side-wall ducts can thereby be made easier.

In the present invention, the rubber side-wall ducts are provided on the left and right sides of the equipment to be cooled. By providing the bottom end parts of the left and right side-wall ducts to the bottom duct, the left and right side-wall ducts can be reinforced by the bottom duct and the rigidity of the left and right side-wall ducts can be increased. Specifically, the bottom duct can also be used as a reinforcing member of the left and right side-wall ducts, and it is possible to eliminate the support members, which were conventionally needed in order to ensure rigidity in the left and right side-wall ducts. By providing the bottom end parts of the left and right side-wall ducts to the bottom duct in this manner, the rigidity of the side-wall ducts can be ensured and the need for reinforcing support members in the side-wall ducts can be eliminated.

Furthermore, in the present invention, the bottom duct has a collision energy-absorbing structure. Collision energy can thereby be absorbed by the collision energy-absorbing structure when the vehicle collides with an obstacle and the obstacle can be protected.

Furthermore, in the present invention, an inclined part projects at an upward incline toward the front of the vehicle body from the rear end part of the bottom duct, and a horizontal part projects substantially horizontally toward the front of the vehicle body from the inclined part. The collision energy-absorbing structure is configured by forming the inclined part and the horizontal part with low rigidity. Collision energy can thereby be absorbed by the collision energy-absorbing structure and the obstacle can be protected by causing the horizontal part and the inclined part to bend when the vehicle collides with an obstacle.

BRIEF DESCRIPTION OF DRAWINGS

FIGS. 12(*a*) and 12(*b*) are views illustrative of an example in which cooling air is guided by the left and right side-wall ducts to an equipment to be cooled;

FIGS. 14(*a*) and 14(*b*) are views illustrative of an example in which collision energy is absorbed by the bottom duct of the air guide duct structure;

FIGS. 24(*a*), 24(*b*) and 24(*c*) are views illustrative of a manner in which transverse interlocking sections of the left side-wall duct shown in FIG. 21 are interlocked with the oblong holes of the front bumper face.

DESCRIPTION OF EMBODIMENTS

Several preferred embodiments of the present invention will be described below with reference to the accompanying drawings.

Embodiment 1

Figure 1:
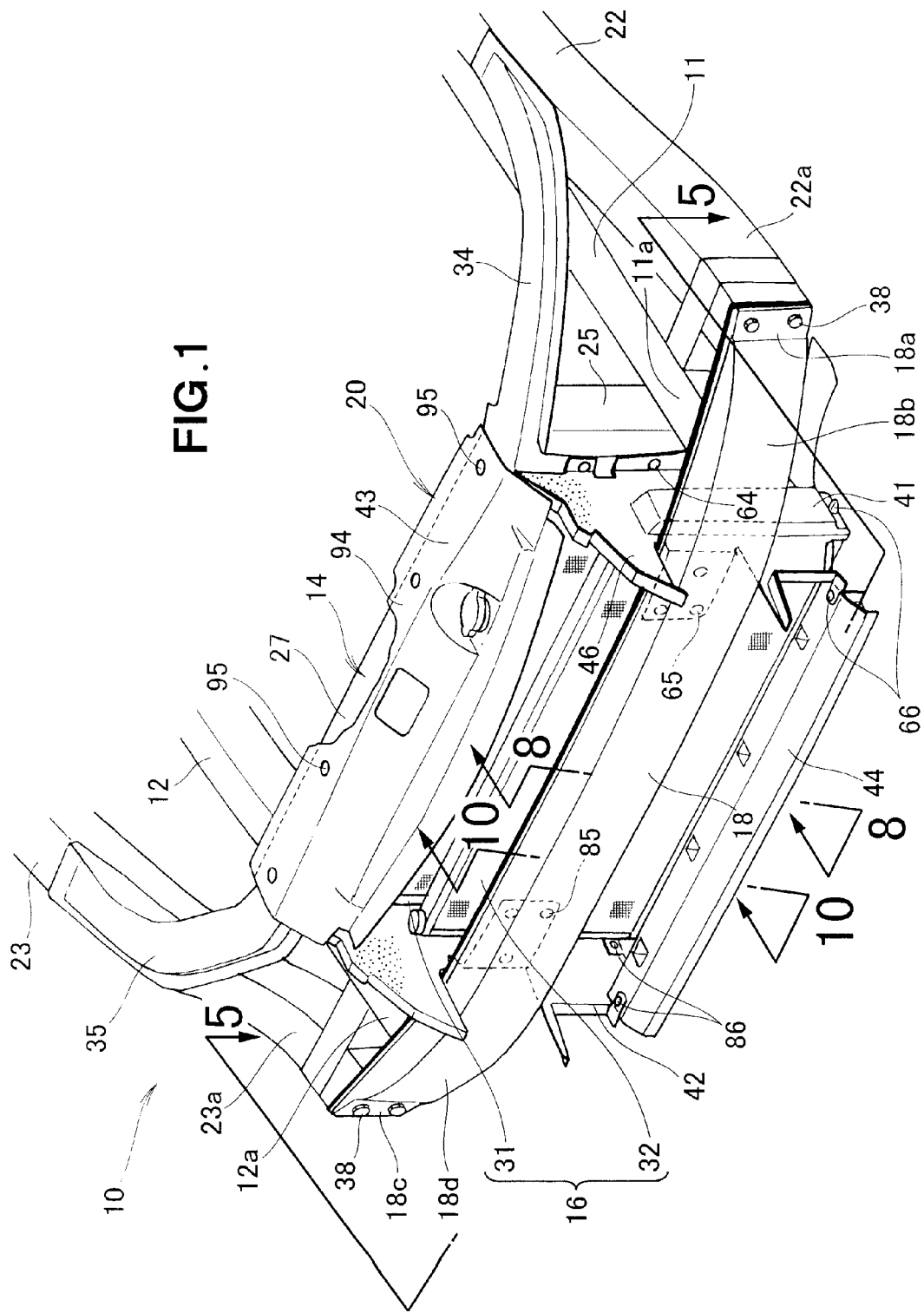
FIG. 1 is a perspective view showing a vehicle body front structure provided with an air guide duct structure for a vehicle according to Embodiment 1 of the present invention.

A vehicle body front structure 10 includes left and right front side frames 11, 12 extending in a longitudinal direction of a vehicle, a front bulk head 14 provided between the front end parts of the left and right front side frames 11, 12, an equipment to be cooled 16 which is provided on (or supported by) the front bulk head 14, a front bumper beam 18 connected to the front ends of both of the left and right front side frames 11, 12, and an air guide duct structure 20 provided between the front bulk head 14 and the front bumper beam 18, as shown in FIG. 1.

A left upper member 22 is provided on a vehicle body outer side of the left front side frame 11. A right upper member 23 is provided on a vehicle body outer side of the right front side frame 12.

The front bulk head 14 includes a left stay 25 provided on the left front side frame 11, a right stay 26 (FIG. 5) provided on the right front side frame 12, an upper member 27 spanning between top end parts of the left and right stays 25, 26, and a lower member 28 (see FIG. 5) spanning between bottom end parts of the left and right stays.

The equipment to be cooled 16 is supported on the front bulk head 14 in such a manner that the equipment to be cooled 16 is disposed either in front of the front bulk head 14 or within a framework of the front bulk head 14. The equipment to be cooled 16 includes a radiator 31 and a condenser 32. The radiator 31 is disposed in front of the front bulk head 14. The condenser 32 is disposed in front of the radiator 31 (see also FIG. 5). The radiator 31 is a heat exchanger for cooling the cooling water of an engine with outside air (with air). The condenser 32 is a heat exchanger for cooling the refrigerant used in the refrigeration cycle of an air conditioner with outside air.

A left end part of the upper member 27 and a left upper member 22 are connected by a left connecting bar 34. A right end part of the upper member 27 and a right upper member 23 are connected by a right connecting bar 35.

A proximal region 18b of a left end 18a of the front bumper beam 18 is attached by a bolt (not shown) to a front end 11a of the left front side frame 11. A proximal region 18d of a right end 18c of the front bumper beam 18 is attached by a bolt (not shown) to a front end 12a of the right front side frame 12. The left end 18a of the front bumper beam 18 is attached by bolts 38 to a front end 22a of the left upper member 22. The right end 18c of the front bumper beam 18 is attached by bolts 38 to a front end 23a of the right upper member 23.

The air guide duct structure 20 is provided between the front bulk head 14 and the front bumper beam 18, and operates to guide outside air as cooling air to the equipment to be cooled 16. This air guide duct structure 20 comprises left and right side-wall duct units 41, 42 provided on left and right sides of the equipment to be cooled 16, a top duct 43 connected to top ends of the left and right side-wall duct units 41, 42, and a bottom duct 44 connected to bottom end parts of the left and right side-wall duct units 41, 42.

Figure 2:
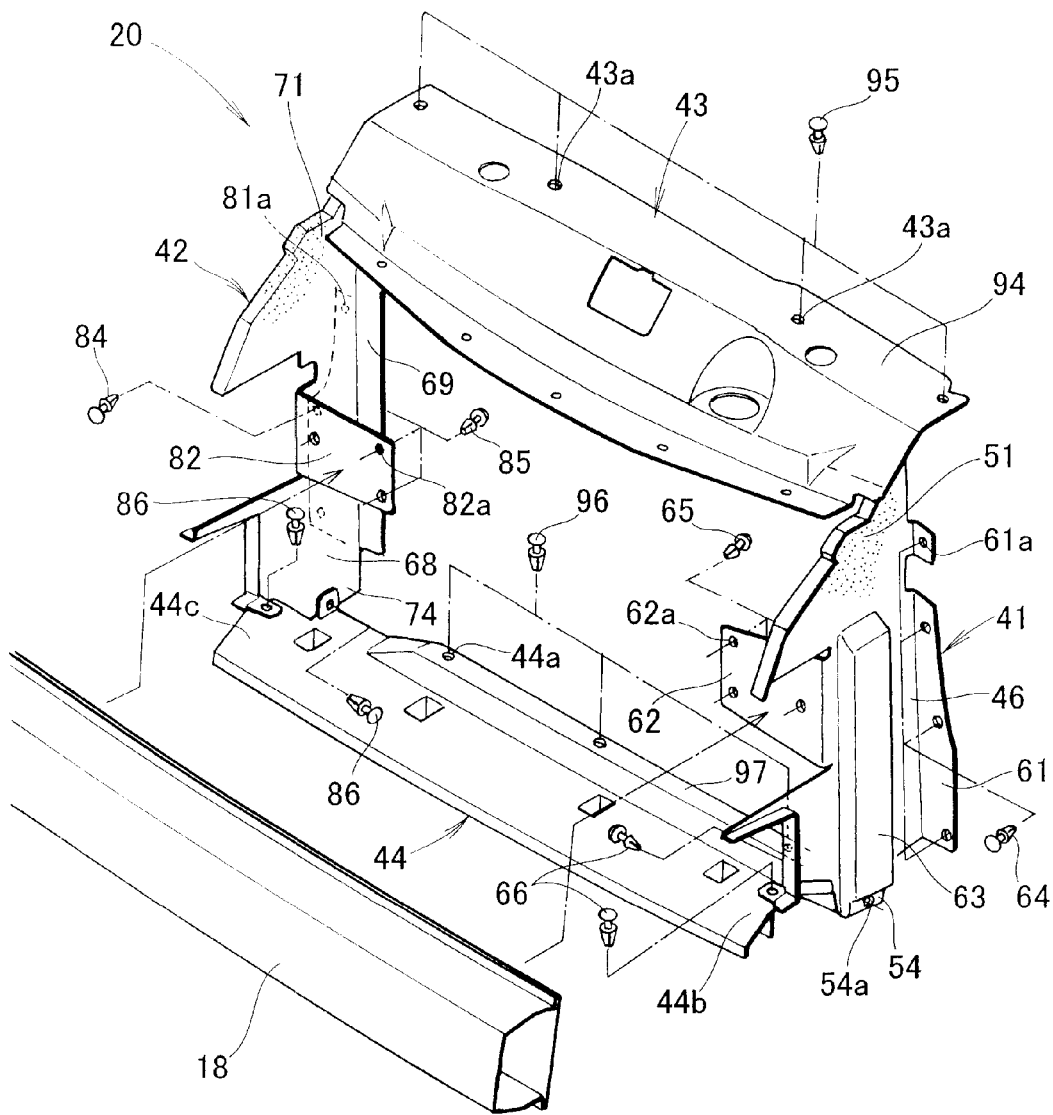
FIG. 2 is a perspective view showing the air guide duct structure shown in FIG. 1.
Figure 3:
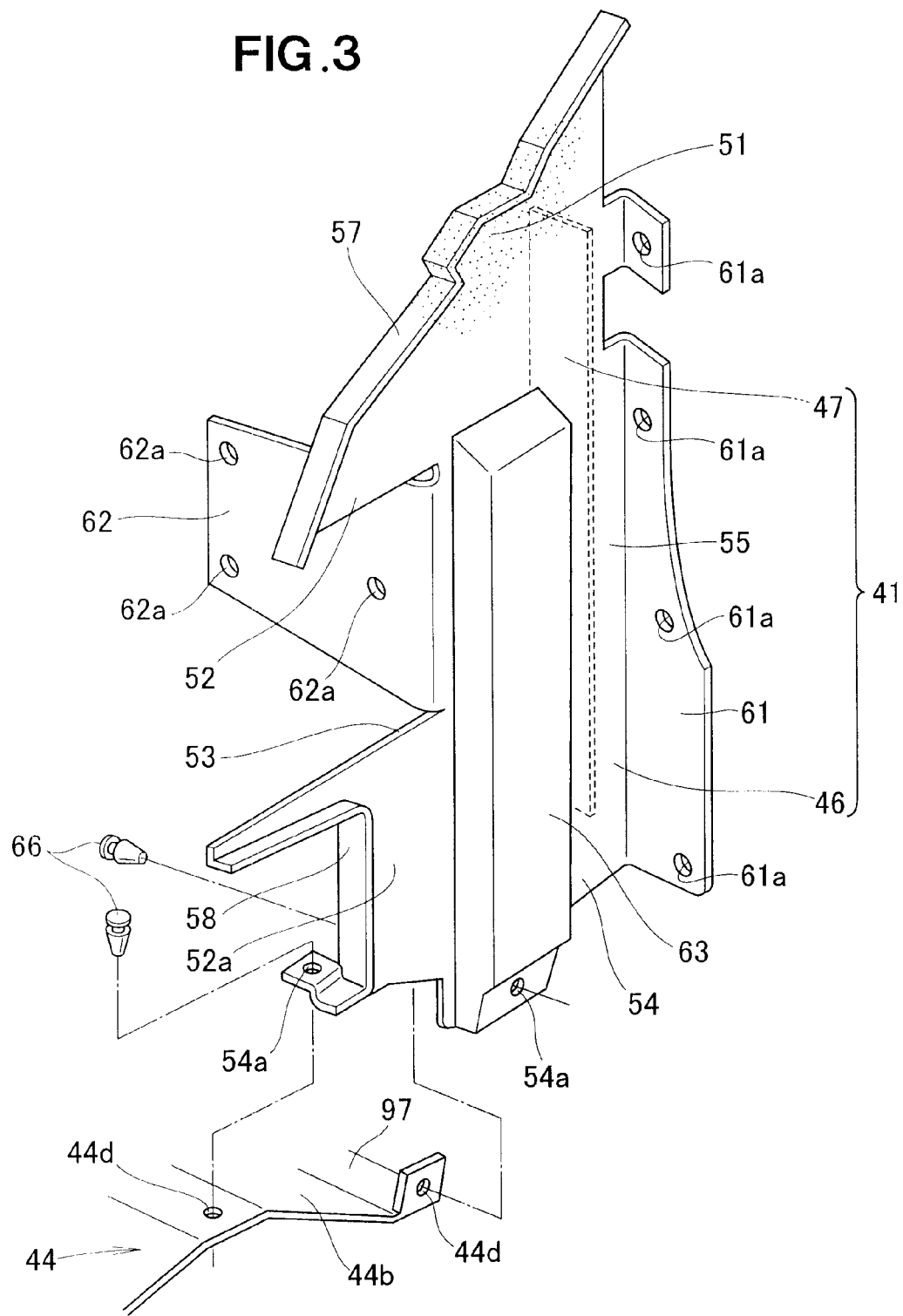
FIG. 3 is a perspective view showing a left side-wall duct unit shown in FIG. 2.

The left side-wall duct unit 41 is formed from a rubber material and comprised of a left side-wall duct 46 provided on the left side of the equipment to be cooled 16 (FIG. 1) and a left seal section 47 provided on the left side-wall duct 46, as shown in FIGS. 2 and 3.

An olefin-based thermoplastic elastomer (thermoplastic olefin (TPO)) is used as an example of the rubber material. At room temperature, the thermoplastic elastomer has the characteristics of rubber, and at high temperatures, the thermoplastic elastomer has the characteristics of softening and becoming able to be compressed, extruded, injected, and otherwise handled similar to thermoplastics. Consequently, by softening the thermoplastic elastomer at a high temperature, the left side-wall duct unit 41 can be easily molded.

The left side-wall duct 46 extends in the longitudinal direction of the vehicle body and guides air from the front of the vehicle as cooling air to the equipment to be cooled 16 (FIG. 1). This left side-wall duct 46 is a plate-shaped member in which a top part 51 is inclined downward toward the front of the vehicle body, an accommodating concavity 53 is formed in a front part 52, a bottom part (a bottom end part) 54 is formed to be substantially horizontal, and a rear part 55 is formed to be substantially vertical. The accommodating concavity 53 is a recession formed into a substantial U shape in order to accommodate the front bumper beam 18 (FIG. 1).

The left side-wall duct 46 further has a top bent piece 57 where the top part 51 is bent toward the outside of the vehicle body, a front bent piece 58 where a front bottom half 52a is bent toward the outside of the vehicle body, a stay attachment piece 61 bent toward the outside of the vehicle body from the rear part 55, and a bumper attachment flap 62 bent toward the inside of the vehicle body from the accommodating concavity 53.

Figure 5:
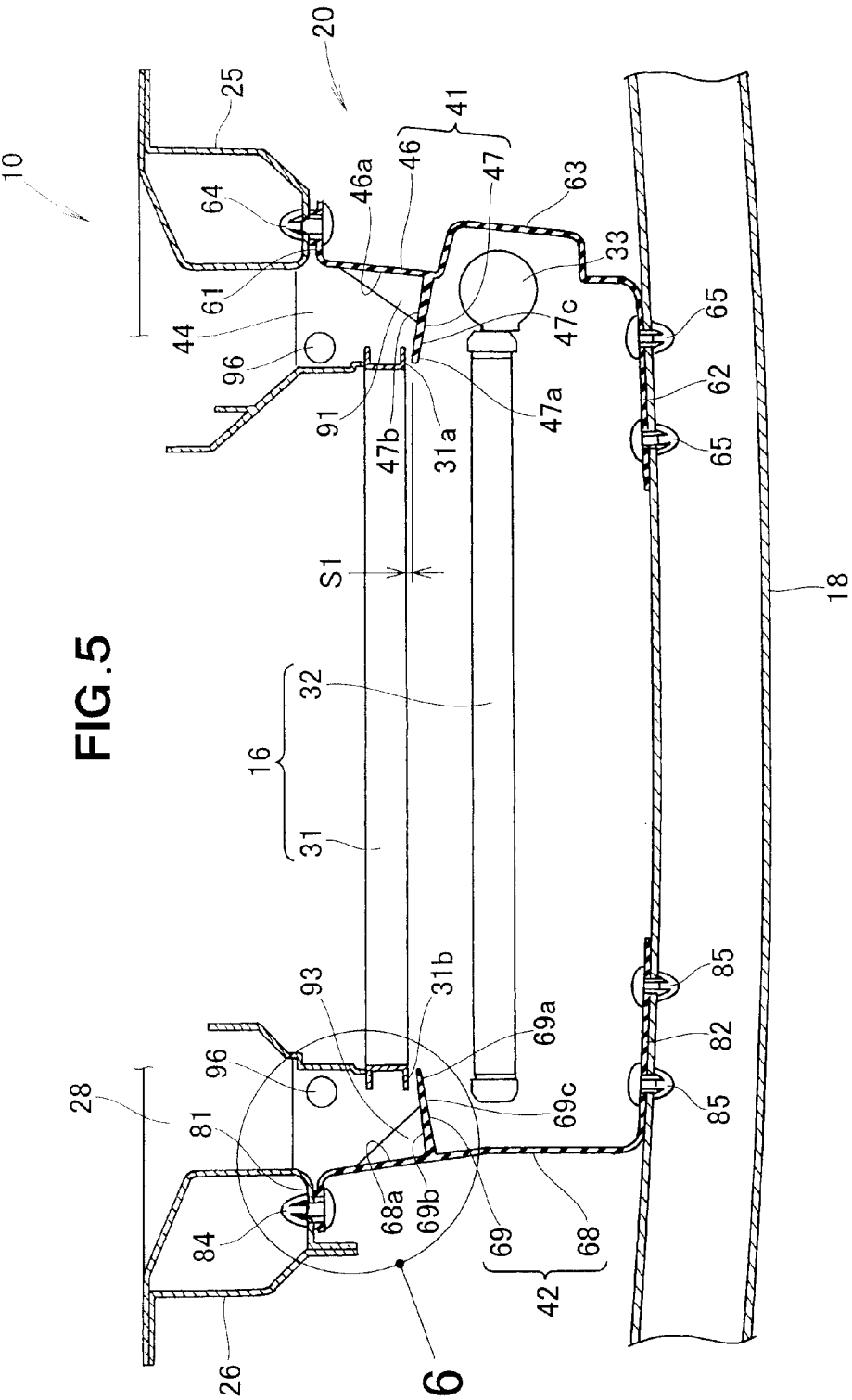
FIG. 5 is a cross-sectional view taken along line 5-5 of FIG. 1.

Furthermore, the left side-wall duct 46 has a bulging part 63 in the center of its side surface. The bulging part 63 is a region made to bulge toward the outside of the vehicle in order to accommodate a receiver tank 33 (FIG. 5). The receiver tank 33 temporarily stores refrigerant that has been liquefied in the condenser 32.

By forming the top bent piece 57, the front bent piece 58, the stay attachment piece 61, the bumper attachment flap 62, and the bulging part 63 in the left side-wall duct 46, the rigidity of the left side-wall duct 46 can be increased.

The stay attachment piece 61 has a plurality of stay attachment holes 61a. This stay attachment piece 61 is attached to the left stay 25 (FIG. 1) by stay clips 64 each inserted into a corresponding one of the stay attachment holes 61a.

The bumper attachment flap 62 is provided so as to be substantially orthogonal to the side wall of the left side-wall duct 46. A plurality of bumper attachment holes 62a are formed in the bumper attachment flap 62. The bumper attachment flap 62 is attached to the front bumper beam 18 by bumper clips 65 (FIG. 1) inserted into each of the bumper attachment holes 62a.

The left side-wall duct 46 has a plurality of duct attachment holes (attachment holes) 54a formed in the bottom part 54. A plurality of duct attachment holes (attachment holes) 44d are formed in the left end 44b of the bottom duct 44. Duct clips (clips) 66 are inserted into each of the duct attachment holes 54a and duct attachment holes 44d. The bottom part 54 of the left side-wall duct 46 is attached to the left end 44b of the bottom duct 44 by the duct clips 66.

As described above, the left side-wall duct 46 is attached to the left stay 25, the front bumper beam 18, and the bottom duct 44 by the clips 64, 65, 66, whereby the left side-wall duct 46 is disposed on the left in the vehicle width direction of the radiator 31 and the condenser 32 (FIGS. 1 and 5).

The left seal section 47 is an elastically deformable rubber member which protrudes approximately in the vehicle width direction from an inner wall surface 46a of the left side-wall duct 46 toward a left side-edge front surface (a side-edge front surface) 31a of the radiator 31, as shown in FIG. 5.

Figure 4:
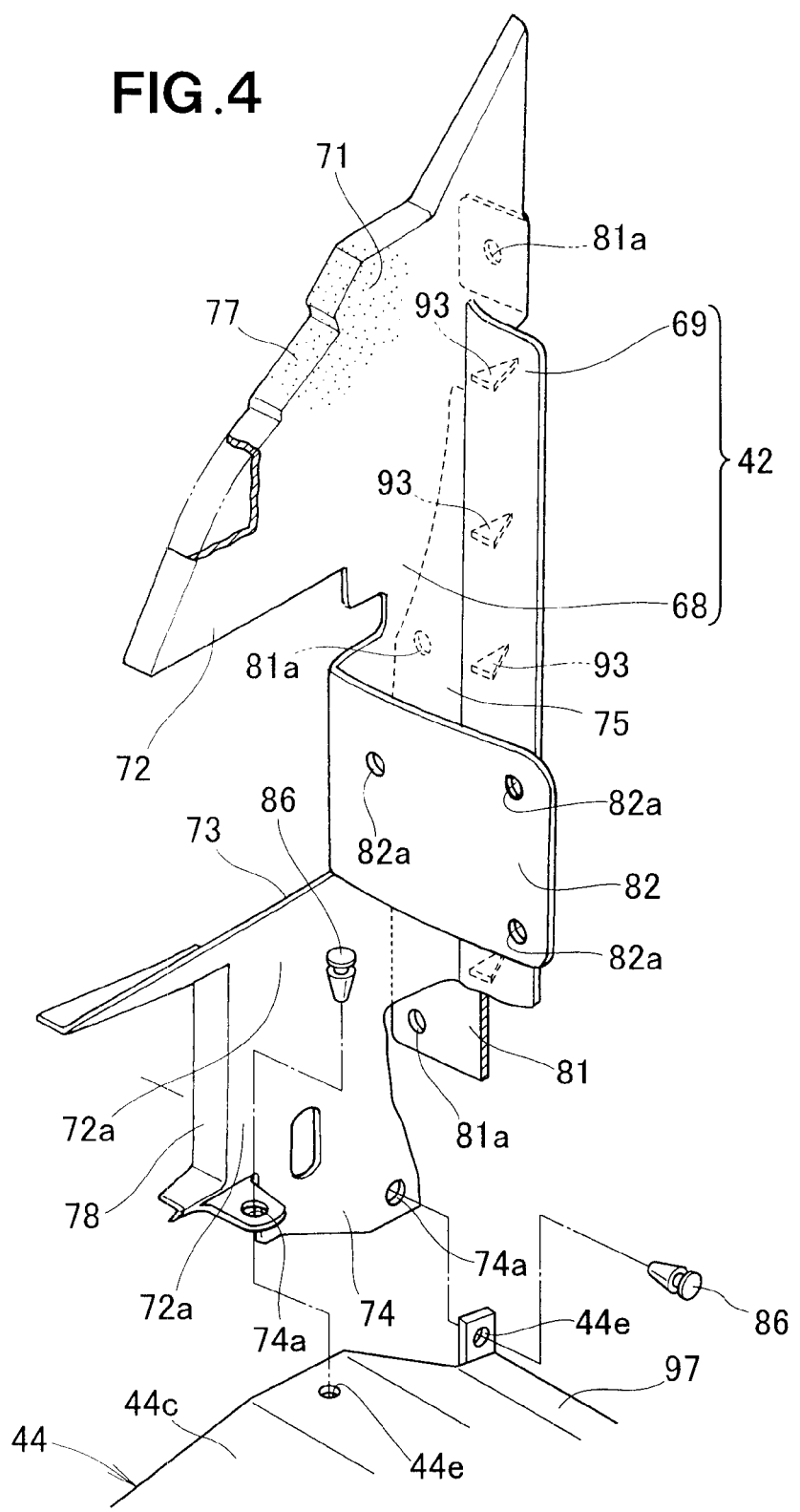
FIG. 4 is a perspective view showing a right side-wall duct unit shown in FIG. 2.

The right side-wall duct unit 42 is formed from a rubber material similar to the left side-wall duct unit 41, as shown in FIGS. 2 and 4. The right side-wall duct unit 42 comprises a right side-wall duct (a side-wall duct) 68 provided on the right side of the equipment to be cooled 16 (FIG. 1), and a right seal section 69 provided on the right side-wall duct 68.

An olefin-based thermoplastic elastomer (thermoplastic olefin (TPO)) or the like is used as the rubber material, similar to the left side-wall duct unit 41. By softening the thermoplastic elastomer at a high temperature, the right side-wall duct unit 42 can be easily molded similar to the left side-wall duct unit 41.

The right side-wall duct 68, which is a plate-shaped member in substantial bilateral symmetry with the left side-wall duct 46, extends in the vehicle longitudinal direction and operates to guide air in front of the vehicle as cooling air to the equipment to be cooled 16 (FIG. 1). This right side-wall duct 68 extends so that a top part 71 is inclined downward toward the front of the vehicle. An accommodating concavity 73 is formed in a front part 72 of the right side-wall duct 68. A bottom part (a bottom end) 74 of the right side-wall duct 68 is formed to be substantially horizontal, and a rear part 75 is formed to be substantially vertical. The accommodating concavity 73 is a recession formed into a substantial U shape in order to accommodate the front bumper beam 18 (FIG. 1).

Furthermore, the right side-wall duct 68 has a top bent piece 77 bent toward the outside of the vehicle from the top part 71, a front bent piece 78 bent toward the outside of the vehicle from the front bottom half 72a, a stay attachment piece 81 bent toward the outside of the vehicle from the rear part 75, and a bumper attachment flap (an attachment flap) 82 bent toward the inside of the vehicle from the accommodating concavity 73.

By forming the top bent piece 77, the front bent piece 78, the stay attachment piece 81, and the bumper attachment flap 82 in the right side-wall duct 68, the rigidity of the right side-wall duct 68 is increased.

The stay attachment piece 81 has a plurality of stay attachment holes 81a. The stay attachment piece 81 is attached to the right stay 26 (FIG. 5) by stay clips 84 each inserted into a corresponding one of the stay attachment holes 81a.

The bumper attachment flap 82 is provided so as to be substantially orthogonal to the side wall of the right side-wall duct 68. A plurality of bumper attachment holes 82a are formed in the bumper attachment flap 82. The bumper attachment flap 82 is attached to the front bumper beam 18 by bumper clips 85 inserted into the bumper attachment holes 82a.

Furthermore, the right side-wall duct 68 has duct attachment holes (attachment holes) 74a formed in the bottom part 74. A plurality of duct attachment holes (attachment holes) 44e are formed in a right end 44c of the bottom duct 44. Duct clips (clips) 86 are inserted into the duct attachment holes 74a and the duct attachment holes 44e. The bottom part 74 of the right side-wall duct 68 is attached to the right end 44c of the bottom duct 44 by the duct clips 86.

As described above, the right side-wall duct 68 is attached to the right stay 26, the front bumper beam 18, and the bottom duct 44 by the clips 84, 85, 86, whereby the right side-wall duct 68 is disposed to the right in the vehicle width direction of the radiator 31 and the condenser 32 (FIG. 5).

As previously described, the bumper attachment flap 62 is provided so as to be substantially orthogonal to the side wall of the left side-wall duct 46, and the bumper attachment flap 82 is provided so as to be substantially orthogonal to the side wall of the right side-wall duct 68. The side wall of the left side-wall duct 46 is thereby reinforced by the bumper attachment flap 62, and the right side-wall duct 68 is reinforced by the bumper attachment flap 82.

Furthermore, the bumper attachment flap 62 is provided on the front bumper beam 18, and the bumper attachment flap 82 is provided on the front bumper beam 18. The left and right side-wall ducts 46, 68 are thereby reinforced by the front bumper beam 18 and the rigidity of the left and right side-wall ducts 46, 68 can be increased. In other words, the front bumper beam 18 can also be used as a reinforcing member of the left and right side-wall ducts 46, 68.

Additionally, the left side-wall duct 46 (specifically, the bottom part 54) is attached by the plurality of duct clips 66 to the left end 44b of the bottom duct 44, and the right side-wall duct 68 (specifically, the bottom part 74) is attached by the plurality of duct clips 86 to the right end 44c of the bottom duct 44. Consequently, the left and right side-wall ducts 46, 68 are reinforced by the bottom duct 44 and the rigidity of the left and right side-wall ducts 46, 68 is increased. Specifically, the bottom duct 44 is also used as a reinforcing member of the left and right side-wall ducts 46, 68, thereby eliminating the need for support members which were needed conventionally in order to ensure rigidity in the left and right side-wall ducts 46, 68. Thus, by providing the bottom parts 54, 74 of the left and right side-wall ducts 46, 68 to the bottom duct 44, the rigidity of the left and right side-wall ducts 46, 68 can be ensured, and reinforcing support members can be eliminated in the left and right side-wall ducts 46, 68.

The plurality of duct attachment holes 54a are formed in the bottom part 54 of the left side-wall duct 46, and the plurality of duct attachment holes 44d are formed in the left end 44b of the bottom duct 44. The plurality of duct attachment holes 74a are formed in the bottom part 74 of the right side-wall duct 68, and the plurality of duct attachment holes 44e are formed in the right end 44c of the bottom duct 44. The left and right side-wall ducts 46, 68 are formed from a rubber material, and the left and right side-wall ducts 46, 68 are thereby softer members than the bottom duct 44. Consequently, the duct attachment holes 54a of the left side-wall duct 46 can easily be aligned with the duct attachment holes 44d of the bottom duct 44, and the duct clips 66 can easily be fitted into the duct attachment holes 54a of the left side-wall duct 46 and the duct attachment holes 44d of the bottom duct 44.

Similarly, the duct attachment holes 74a of the right side-wall duct 68 can easily be aligned with the duct attachment holes 44e of the bottom duct 44, and the duct clips 86 can easily be fitted into the duct attachment holes 74a of the right side-wall duct 68 and the duct attachment holes 44e of the bottom duct 44.

Figure 6:
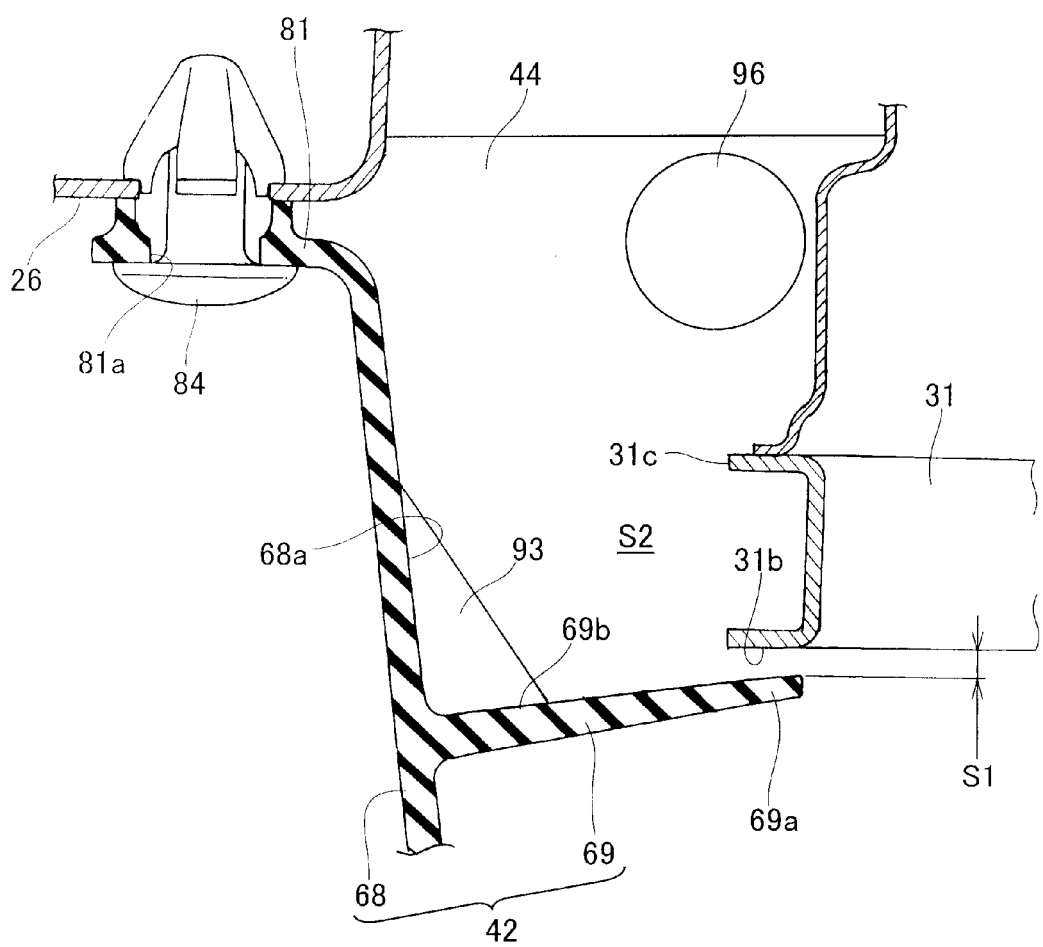
FIG. 6 is a cross-sectional view showing on enlarged scale an area indicated by 6 in FIG. 5.

The right seal section 69 is an elastically deformable rubber member which protrudes substantially in the vehicle width direction from an inner wall surface 68a of the right side-wall duct 68 toward a right side-edge front surface (a side-edge front surface) 31b of the radiator 31, as shown in FIG. 6.

A distal end part 69a of the right seal section 69 extends up to the right side-edge front surface 31b of the radiator 31, and the distal end part 69a is separated from the right side-edge front surface 31b of the radiator 31 by a predetermined distance S1 toward the front of the vehicle.

A plurality of right ribs 93 for reinforcing are provided on a rear wall surface 69b of the right seal section 69. Each of the plurality of right ribs 93 is formed into a substantially triangular shape so as to connect from the rear wall surface 69b of the right seal section 69 to the inner wall surface 68a of the right side-wall duct 68. The plurality of right ribs 93 are provided in predetermined distances vertically along the right seal section 69 (FIG. 4). It is thereby possible to provide the right seal section 69 with suitable rigidity via the plurality of reinforcing right ribs 93, and the precision of the right seal section 69 can be increased.

The left seal section 47 is bilaterally symmetric with the right seal section 69, a distal end 47a is extended up to the left side-edge front surface 31a of the radiator 31, and the distal end 47a is separated from the left side-edge front surface 31a of the radiator 31 by a predetermined distance S1 toward the front of the vehicle, as shown in FIG. 5.

A plurality of left ribs 91 for reinforcing are provided on a rear wall surface 47b of the left seal section 47. Each of the plurality of left ribs 91 is formed into a substantially triangular shape so as to connect from the rear wall surface 47b of the left seal section 47 to the inner wall surface 46a of the left side-wall duct 46. The plurality of left ribs 91 are provided in predetermined intervals vertically along the left seal section 47, similar to the right ribs 93. It is thereby possible to provide the left seal section 47 with suitable rigidity via the plurality of reinforcing left ribs 91, and the precision of the left seal section 47 can be increased.

Figure 11:
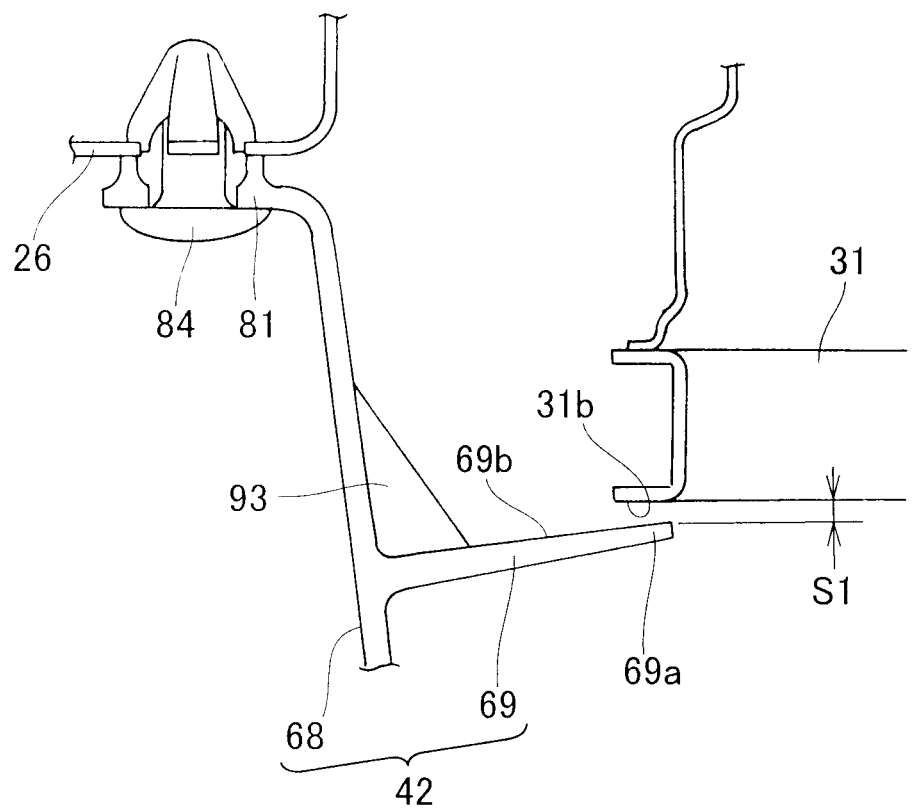
FIG. 11 is a view showing an example of a right seal section of the right side-wall duct being kept separated from a radiator.

FIG. 11 is used to give a detailed description of the reason for separating the left and right seal sections 47, 69 by a predetermined distance S1 toward the front of the vehicle from the left and right side-edge front surfaces 31a, 31b of the radiator 31.

The left and right side-wall duct units 41, 42 are each formed from a single piece of rubber material. The left side-wall duct 46 and left seal section 47 of the left side-wall duct unit 41 can be molded from a single piece of rubber material without using two-color molding. The right side-wall duct 68 and right seal section 69 of the right side-wall duct unit 42 can be molded from a single piece of rubber material without using two-color molding.

In cases in which the side-wall ducts are formed from a resinous material and the seal sections are formed from a rubber material, the side-wall ducts and the seal sections must be molded with two-color molding. It is thereby easy to mold the left and right side-wall duct units 41, 42 by forming the left and right side-wall duct units 41, 42 from single pieces of rubber material, and the cost of the left and right side-wall duct units 41, 42 can be kept low.

The top duct 43 is provided on the respective top part 51, 71 sides of the left and right side-wall ducts 46, 68, as shown in FIGS. 1 and 2. The top duct 43 is a hard resinous (a resinous) plate formed into a substantially triangular shape. A polypropylene resin (PP) is used as an example of the hard resinous material.

A plurality of upper attachment holes 43a are formed in a rear part 94 of the top duct 43. The top duct 43 is attached to the upper member 27 of the front bulk head 14 by upper clips 95 inserted into each of the upper attachment holes 43a. The top duct 43 is provided on the top side of the equipment to be cooled 16 (the radiator 31 or the condenser 32).

Thus, by providing the hard resinous top duct 43 on the top side of the equipment to be cooled 16, the top duct 43 can be used as a surface that guides air, and air in front of the vehicle can be satisfactorily guided as cooling air to the equipment to be cooled 16 via the top duct 43.

By providing the hard resinous top duct 43 on the top side of the equipment to be cooled 16, the top duct 43 covers the front bulk head 14 and the equipment to be cooled 16. When the engine hood (not shown) is opened, the front bulk head 14 and the equipment to be cooled 16 can be hidden by the top duct 43, and an attractive appearance can therefore be ensured, improving merchantability.

The bottom duct 44 is provided on the respective bottom parts 54, 74 of the left and right side-wall ducts 46, 68. The bottom duct 44 is a hard resinous (a resinous) plate formed into a substantially rectangular shape. A polypropylene resin (PP) is used as an example of the hard resinous material.

A plurality of lower attachment holes 44a are formed in a rear part 97 of the bottom duct 44. The bottom duct 44 is attached to the lower member 28 (see FIG. 5) of the front bulk head 14 by lower clips 96 inserted into each of the lower attachment holes 44a. The bottom duct 44 is provided on the bottom side of the equipment to be cooled 16 (the radiator 31 or the condenser 32). The bottom duct 44 is described in detail in FIGS. 7 through 10.

As described above, the left and right side-wall duct units 41, 42 are disposed respectively on the left and right sides of the radiator 31 and the condenser 32, and the top and bottom ducts 43, 44 are disposed respectively on the top and bottom sides of the radiator 31 and the condenser 32, whereby the left and right side-wall duct units 41, 42 and the top and bottom ducts 43, 44 are provided so as to enclose the radiator 31 and the condenser 32. A substantially rectangular shape is formed by the left and right side-wall duct units 41, 42 and the top and bottom ducts 43, 44.

In other words, the air guide duct structure 20 for a vehicle is divided into four ducts: the left and right side-wall ducts 46, 68, and the top and bottom ducts 43, 44. The left and right side-wall ducts 46, 68 are formed from a rubber material, and the top and bottom ducts 43, 44 are formed from a hard resin material.

Thus, by dividing the vehicle air guide duct structure 20 into four parts consisting of the left and right side-wall ducts 46, 68 and the top and bottom ducts 43, 44, the operation of attaching the air guide duct structure 20 can be performed easily. Furthermore, by forming the top and bottom ducts 43, 44 from a hard resin material, they can be handled more easily than if they were to be formed from a rubber material, and the operation of attaching the air guide duct structure 20 can be performed even more easily.

Figure 7:
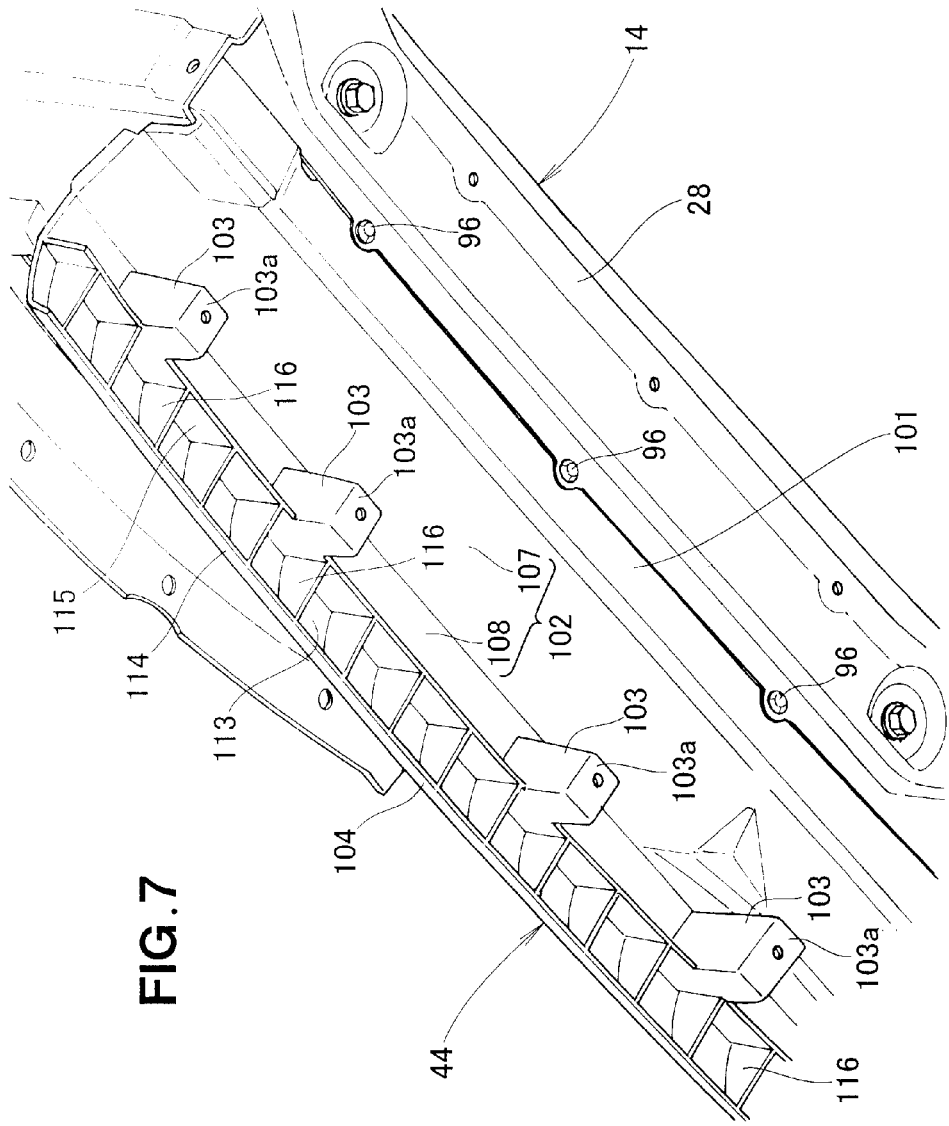
FIG. 7 is a perspective view of a bottom duct shown in FIG. 2, seen from the bottom of the front of the vehicle body.

The bottom duct 44 has a rear end part 101 provided on the front bulk head 14, a collision energy-absorbing structure 102 provided on the front side of the rear end part 101, a plurality of protruding supports 103 which protrude downward from the collision energy-absorbing structure 102, and a projecting part 104 provided on the front side of the collision energy-absorbing structure 102, as shown in FIG. 7.

Figure 8:
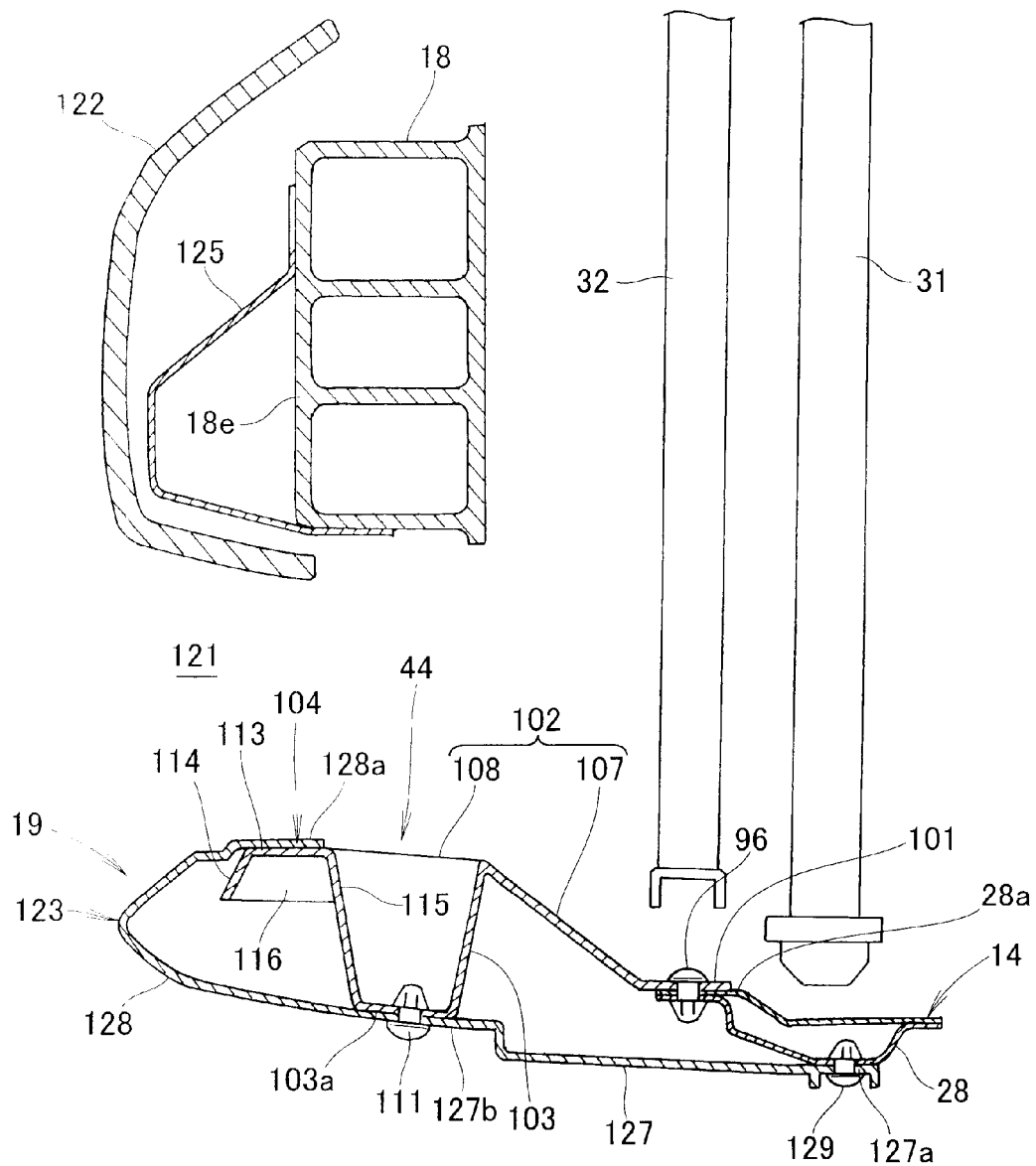
FIG. 8 is an enlarged cross-sectional view taken along line 8-8 of FIG. 1.
Figure 9:
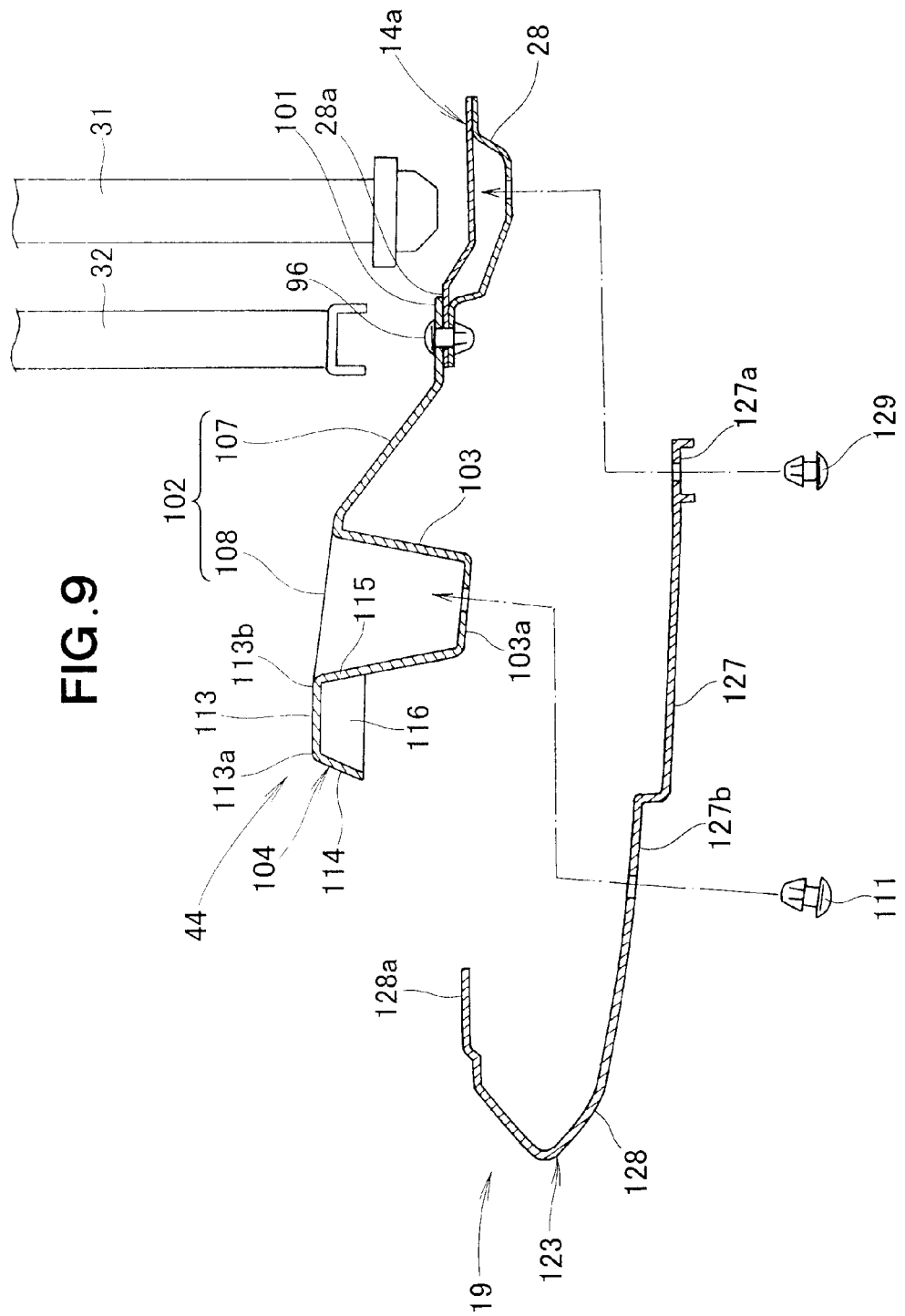
FIG. 9 is a cross-sectional view showing a state in which a bottom bumper face has been disassembled from the bottom duct shown in FIG. 8.

The rear end part 101 of the bottom duct 44 is formed to be substantially horizontal along the front end 28a of the lower member 28 of the front bulk head 14, as shown in FIGS. 8 and 9. The rear end part 101 of the bottom duct 44 is placed over the front end 28a of the lower member 28, and the rear end part 101 is attached to the front end 28a in this state by the plurality of lower clips 96 (see FIG. 2 as well).

Figure 10:
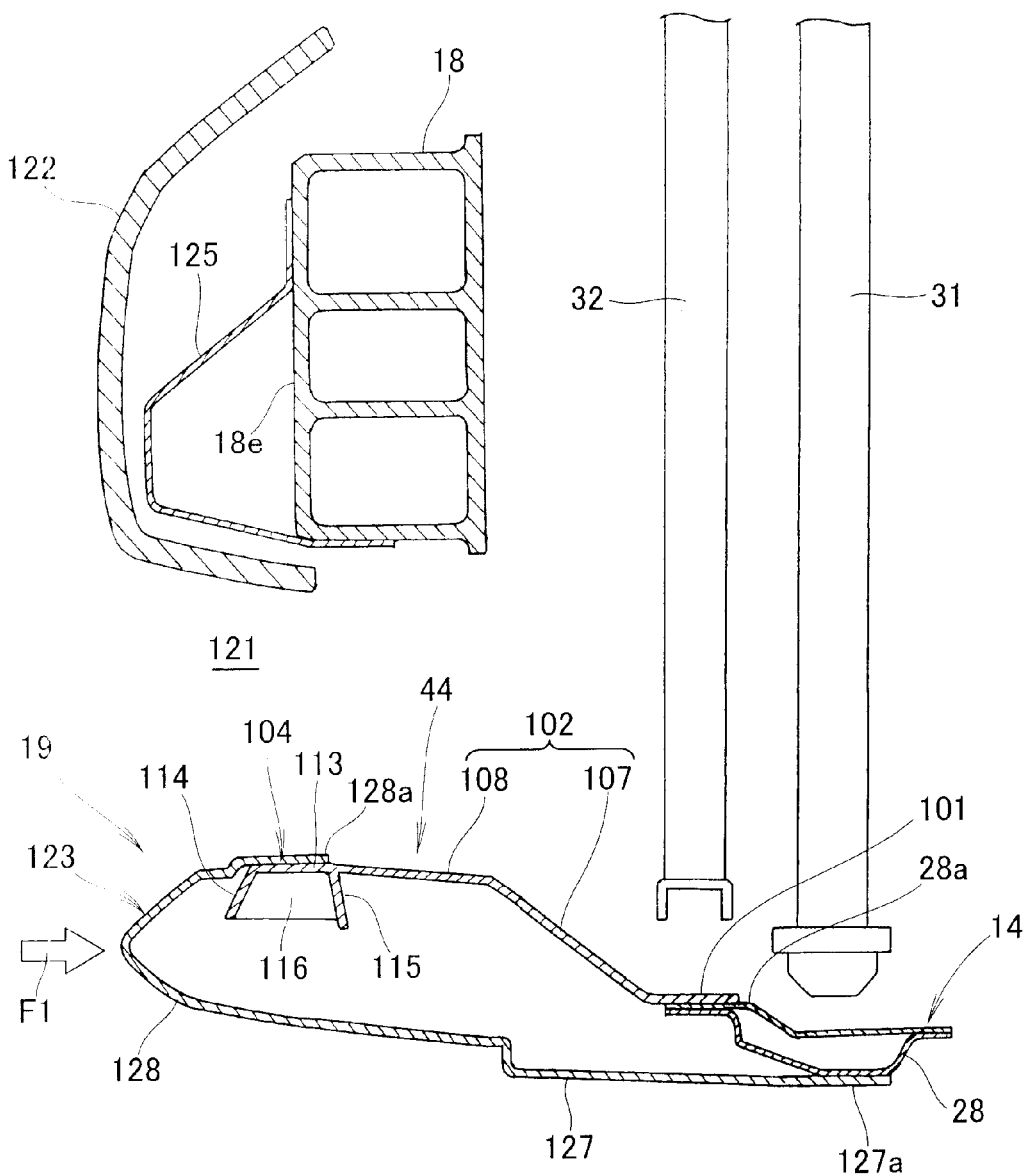
FIG. 10 is an enlarged cross-sectional view taken along line 10-10 of FIG. 1.

The collision energy-absorbing structure 102 has an inclined part 107 projecting at an upward slope from the rear end part 101 toward the front of the vehicle body, and a horizontal part 108 projecting substantially horizontally from the inclined part 107 toward the front of the vehicle body, as shown in FIG. 10. The inclined part 107 and the horizontal part 108 are formed into a dogleg shape. Consequently, the collision energy-absorbing structure 102 is formed with low rigidity so that the inclined part 107 and the horizontal part 108 can be bent by a collision load F1. Thus, collision energy can be absorbed by bending the inclined part 107 and the horizontal part 108 with the collision load.

The protruding supports 103 protrude downward from the horizontal part 108 as shown in FIGS. 8 and 9. Bottom parts 103a of the protruding supports 103 are in contact with a front bumper face 19 (specifically, a bumper bottom part 127 of a bottom bumper face 123). In this state, the bumper bottom part 127 is attached to the bottom part 103a of the protruding supports 103 by a plurality of clips 111.

The projecting part 104 has a front end part 113 which projects substantially horizontally from the horizontal part 108 toward the front of the vehicle body, a bent piece 114 which is bent downward from a front end 113a of the front end part 113, a projecting piece 115 which is bent downward from a rear end 113b of the front end part 113, and a plurality of reinforcing ribs 116 (see FIG. 7 as well) provided in the vehicle width direction to the front end part 113, the bent piece 114, and the projecting piece 115.

By providing the plurality of reinforcing ribs 116 to the front end part 113, the bent piece 114, and the projecting piece 115, the projecting part 104 can be formed with high rigidity, and a top rear area 128a of the front bumper face 19 can be supported by the projecting part 104 (specifically, by the front end part 113).

The front bumper face 19 is composed of a top bumper face 122 and the bottom bumper face 123 as shown in FIGS. 8 and 10. The front bumper face 19 has a grill opening (an air inlet) 121 formed vertically between the top bumper face 122 and the bottom bumper face 123. The top bumper face 122 is provided in front of the front bumper beam 18. A collision absorbing member 125 is provided on a front wall 18e of the front bumper beam 18.

The bottom bumper face 123 has the bumper bottom part 127 formed to be substantially horizontal, and a bumper distal end part 128 provided on the front end part of the bumper bottom part 127. A rear end part 127a of the bumper bottom part 127 is attached to the lower member 28 by a plurality of clips 129, and a front ridge 127b is attached to the bottom parts 103a of the protruding supports 103 by the plurality of clips 111.

The bumper distal end part 128 is formed into a shape which tapers toward the front of the vehicle body, and the top rear area 128a is placed over the front end part 113 of the bottom duct 44.

Next, the action of the left and right seal sections 47, 69 of the air guide duct structure 20 will be described based on FIGS. 11 to 13. The left and right seal sections 47, 69 are bilaterally symmetric members, and in FIGS. 11 to 13, the right seal section 69 is described while a description of the left seal section 47 is omitted.

First is a description of the state while the vehicle is idling, in which the right seal section 69 is separated from the right side-edge front surface 31b of the radiator 31.

The distal end part 69a of the right seal section 69 is separated from the right side-edge front surface 31b of the radiator 31 by a predetermined distance S1 toward the front of the vehicle body, as shown in FIG. 11. Consequently, when the vehicle is idling, the distal end part 69a of the right seal section 69 can be kept separated from the right side-edge front surface 31b. The right seal section 69 thereby does not affect the vibration characteristics of the radiator 31 during idling, and instances of the right seal section 69 resonating and vibration increasing are suppressed, for example.

The right seal section 69 has reinforcing right ribs 93 provided on the rear wall surface 69b. Consequently, the right seal section 69 is provided with suitable rigidity by the reinforcing right ribs 93 and the precision of the right seal section 69 can be increased. Consequently, the distal end part 69a of the right seal section 69 can be kept reliably separated from the right side-edge front surface 31b while the vehicle is idling.

Figure 13:
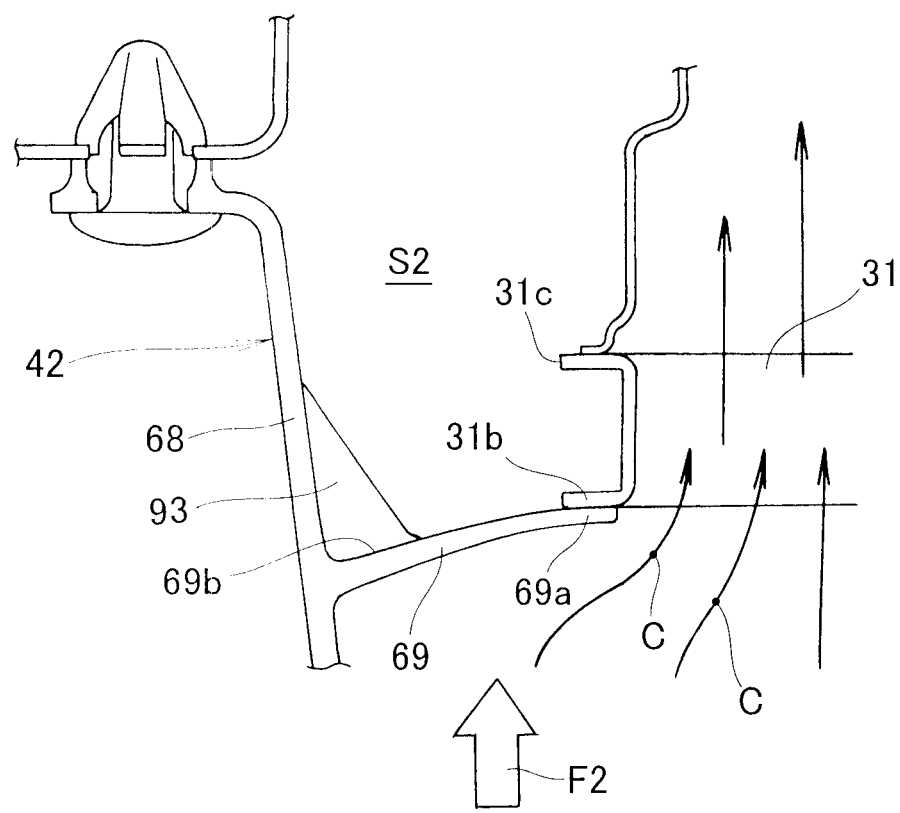
FIG. 13 is a view showing the right seal section of the right side-wall duct being in contact with the radiator.

Next, FIGS. 12 and 13 are referenced to describe an example in which a gap (a space) S2 between the right side-wall duct 68 and the right-side edge 31c of the radiator 31 is closed off by the right seal section 69 when the vehicle is traveling.

When the vehicle is traveling, air in front of the vehicle is led by the left and right side-wall ducts 46, 68 and the top and bottom ducts 43, 44 (FIG. 2), and is guided as shown by arrow A as cooling air (traveling air) to the equipment to be cooled 16, as shown in FIG. 12(a).

Due to the cooling air being guided as shown by arrow A, traveling air pressure F2 acts on the right seal section 69 as shown in FIG. 12(b). The right seal section 69 is a rubber member capable of elastic deformation, which projects out in the vehicle width direction. The traveling air pressure F2 can be made to act substantially orthogonal to the right seal section 69. Consequently, the right seal section 69 can be elastically deformed by the traveling air pressure F2 toward the right side-edge front surface 31b of the radiator 31, as shown by arrow B.

Due to the right seal section 69 being elastically deformed toward the right side-edge front surface 31b, the distal end part 69a of the right seal section 69 comes in contact with the right side-edge front surface 31b as shown in FIG. 13. Consequently, the gap (the space) S2 between the right side-wall duct 68 and the right-side edge 31c can be closed off by the right seal section 69. The cooling air (the traveling air) guided to the radiator 31 by the right side-wall duct 68 can thereby be efficiently guided to the radiator 31 as shown by the arrows C.

The reinforcing right ribs 93 are provided on the rear wall surface 69b of the right seal section 69. By providing the reinforcing right ribs 93, the right seal section 69 can be provided with suitable rigidity and the precision of the right seal section 69 can be increased. Consequently, when the vehicle is traveling, the distal end part 69a of the right seal section 69 can reliably be brought in contact with the right side-edge front surface 31b. The gap (the space) S2 between the right side-wall duct 68 and the right-side edge 31c can thereby be more satisfactorily closed off by the right seal section 69.

Furthermore, the right side-wall duct unit 42 (the right seal section 69) is a soft member made of rubber. Consequently, when the distal end part 69a of the right seal section 69 is brought in contact with the right side-edge front surface 31b, there is no risk of the radiator 31 being scratched by the right seal section 69.

Next, FIG. 14 is referenced to describe an example in which collision energy is absorbed by the bottom duct 44 of the air guide duct structure 20. The vehicle, traveling at a low speed, moves as shown by arrow D and the bumper distal end part 128 of the front bumper face 19 collides with an obstacle 132, as shown in FIG. 14(a).

The bumper distal end part 128 of the front bumper face 19 deforms and the projecting part 104 of the bottom duct 44 comes in contact with the obstacle 132, as shown in FIG. 14(b). Consequently, a collision load F1 acts on the projecting part 104 of the bottom duct 44 as shown by the arrow.

The bottom duct 44 has the collision energy-absorbing structure 102 (i.e. the horizontal part 108 and the inclined part 107) on the rear side of the projecting part 104. The horizontal part 108 and the inclined part 107 are thereby bent when the vehicle collides with the obstacle 132 and the collision load F1 acts on the projecting part 104 of the bottom duct 44 as shown by the arrow. Thus, by bending the horizontal part 108 and the inclined part 107, the collision energy is absorbed by the collision energy-absorbing structure 102 and the obstacle 132 can be protected.

The air guide duct structure 20 according to the present invention is not limited to Embodiment 1 previously described; suitable modifications, improvements, and the like can be made. For example, the front bulk head 14, the equipment to be cooled 16, the front bumper beam 18, the air guide duct structure 20, the top duct 43, the bottom duct 44, the left side-wall duct 46, the bottom part 54 of the left-side wall duct, the bumper attachment flaps 62, 82, the duct clips 66, 86, the right side-wall duct 68, the bottom part 74 of the right side-wall duct, and other components presented in the previous example are not limited to the shapes and configurations therein; suitable modifications can be made.

Embodiment 2

Figure 15:
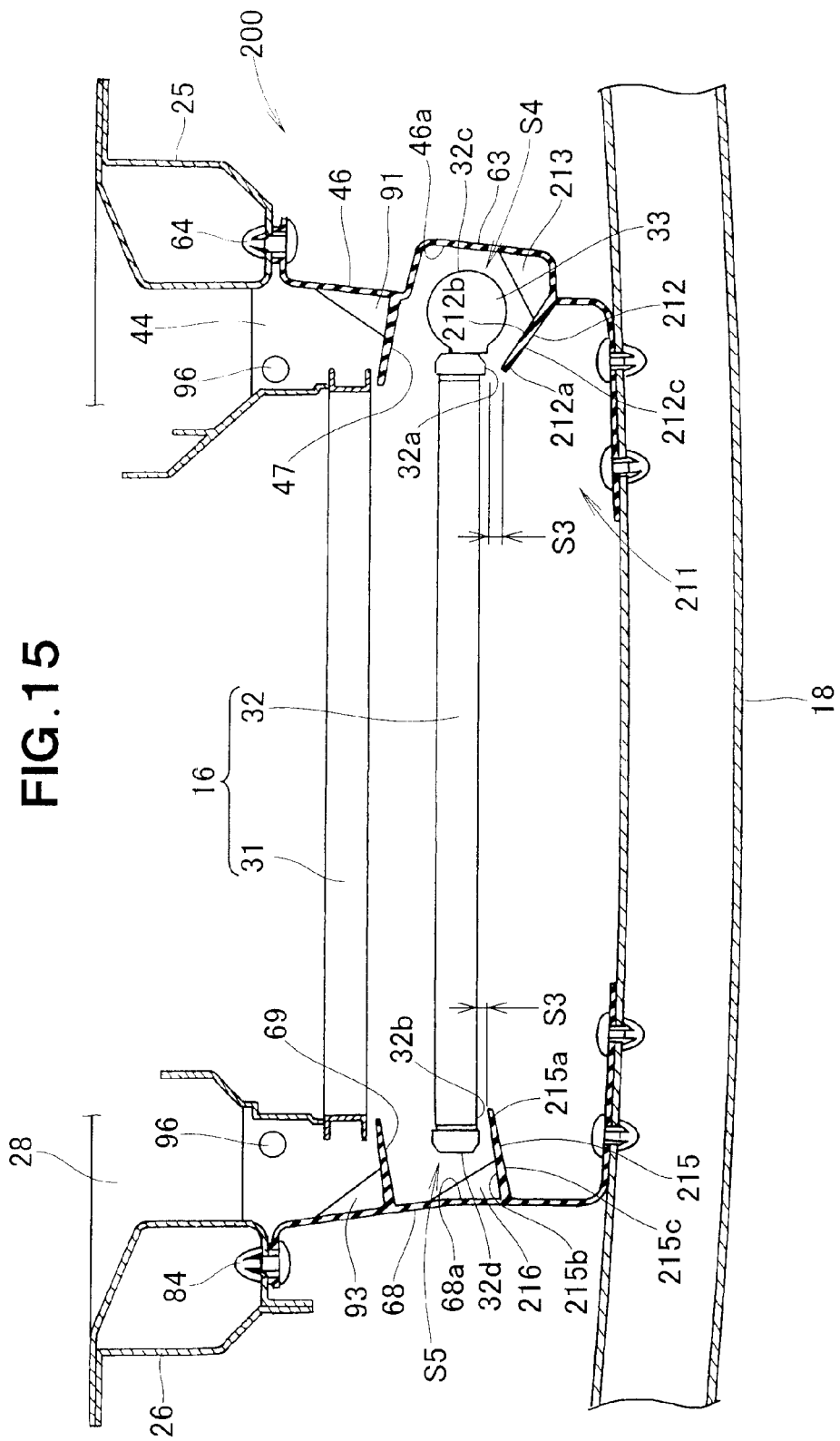
FIG. 15 is a cross-sectional view equivalent to FIG. 5, showing an air guide duct structure according to Embodiment 2.

Next, an air guide duct structure 200 according to Embodiment 2 is described based on FIG. 15. In the air guide duct structure 200 of Embodiment 2, the same symbols are used to denote the same type of members as those constituting the air guide duct structure 20 of Embodiment 1, and detailed descriptions thereof are omitted. The air guide duct structure 200 according to Embodiment 2 comprises a seal unit 211 for the condenser 32. Hereinbelow, in the description of Embodiment 2, the left seal section 47 of Embodiment 1 is a left first seal section 47, the left ribs 91 are left first ribs 91, the right seal section 69 is a right first seal section 69, and the right ribs 93 are right first ribs 93.

The seal unit 211 comprises a left second seal section (a seal section) 212 provided on the left side-wall duct 46, a plurality of left second ribs (ribs) 213 for reinforcing provided on the left second seal section 212, a right second seal section (a seal section) 215 provided on the right side-wall duct 68, and a plurality of right second ribs (ribs) 216 for reinforcing provided on the right second seal section 215, as shown in FIG. 15.

The left second seal section 212 is an elastically deformable rubber member which protrudes in the vehicle width direction from the inner wall surface 46a of the left side-wall duct 46 toward a left side-edge front surface (a side-edge front surface) 32a of the condenser 32. A distal end part 212a of the left second seal section 212 extends up to the left side-edge front surface 32a of the condenser 32, and the distal end part 212a is positioned so as to be separated from the left side-edge front surface 32a of the condenser 32 by a predetermined distance S3 toward the front of the vehicle body.

A plurality of left second ribs 213 for reinforcing are provided on a rear-wall surface 212b of the left second seal section 212. Each of the plurality of left second ribs 213 is formed to be substantially trapezoidal so as to connect from the rear-wall surface 212b of the left second seal section 212 to the inner wall surface 46a of the left side-wall duct 46.

The left second ribs 213 are provided in a plurality at predetermined vertical intervals along the left second seal section 212, similar to the left ribs (the left first ribs) 91 of Embodiment 1. The left second seal section 212 can thereby be provided with suitable rigidity by the plurality of reinforcing left second ribs 213, and the precision of the left second seal section 212 can be increased.

The right second seal section 215 is a member that is substantially bilaterally symmetric with the left second seal section 212. Specifically, the right second seal section 215 is an elastically deformable rubber member that protrudes in the vehicle width direction from the inner wall surface 68a of the right side-wall duct 68 toward a right side-edge front surface (a side-edge front surface) 32b of the condenser 32. A distal end part 215a of the right second seal section 215 is extended up to the right side-edge front surface 32b of the condenser 32, and is positioned so that a distal end part 213a is separated from the right side-edge front surface 32b of the condenser 32 by a predetermined distance S3 toward the front of the vehicle body.

A plurality of right second ribs 216 for reinforcing are provided on a rear wall surface 215b of the right second seal section 215. Each of the plurality of right second ribs 216 is formed to be substantially triangular so as to connect from the rear wall surface 215b of the right second seal section 215 to the inner wall surface 68a of the right side-wall duct 68.

The right second ribs 216 are provided in a plural number at predetermined vertical intervals along the right second seal section 215, similar to the right ribs (right first ribs) 93 of Embodiment 1. The right second seal section 215 can thereby be provided with suitable rigidity by the plurality of reinforcing right second ribs 216, and the precision of the right second seal section 215 can be increased.

As described above, in the seal unit 211 for the condenser 32, the distal end parts 212a, 215a of the left and right second seal sections 212, 215 are separated from the left and right side-edge front surfaces 32a, 32b of the condenser 32 by a predetermined distance S3 toward the front of the vehicle body. Consequently, when the vehicle is idling, the left and right distal end parts 212a, 215a can be kept separated from the left and right side-edge front surfaces 32a, 32b. The left and right second seal sections 212, 215 thereby do not affect the vibration characteristics of the condenser 32 during idling, and instances of the left and right second seal sections 212, 215 resonating and vibration increasing are suppressed, for example.

When the vehicle is traveling, cooling air is led by the left and right side-wall ducts 46, 68 and the top and bottom ducts 43, 44 (FIG. 2), and the cooling air (the traveling air) is guided to the equipment to be cooled 16. The guiding of the cooling air causes traveling air pressure to act on the left and right second seal sections 212, 215. The left and right second seal sections 212, 215 are elastically deformable rubber members which project out in the vehicle width direction.

The traveling air pressure acts so as to be substantially orthogonal to these left and right second seal sections 212, 215. Consequently, the left and right second seal sections 212, 215 are elastically deformed toward the left and right side-edge front surfaces 32a, 32b by the traveling air pressure and brought in contact with the left and right side-edge front surfaces 32a, 32b. The gap (the space) S4 between the left side-wall duct 46 and a left side edge (specifically, a left side-edge of the receiver tank 33) 32c can thereby be closed off by the left second seal section 212, and the gap (the space) S5 between the right side-wall duct 68 and a right side edge 32d can be closed off by the right second seal section 215. Therefore, the cooling air (the traveling air) guided toward the condenser 32 can be efficiently guided to the condenser 32 by the left and right side-wall ducts 46, 68.

As previously described, the left and right second seal sections 212, 215 are soft members made of rubber. Consequently, the condenser 32 is not scratched by the left and right second seal sections 212, 215 even if the left and right second seal sections 212, 215 come in contact with the left and right side-edge front surfaces 32a, 32b.

The air guide duct structures 20, 200 of the present invention are not limited to those of Embodiments 1 and 2; suitable modifications, improvements, and other changes can be made. For example, in Embodiment 1, an example was described in which the left and right first ribs 91, 93 connecting respectively to the left and right side-wall ducts 46, 68 are provided on the rear wall surfaces 47b, 69b of the left and right first seal sections 47, 69, but the present invention is not limited to this configuration. For example, it is also possible to provide the front wall surfaces 47c, 69c (FIG. 5) of the left and right first seal sections 47, 69 with reinforcing first ribs that connect respectively to the left and right side-wall ducts 46, 68.

In Embodiment 2, an example was described in which the left and right second ribs 213, 216 that connect respectively to the left and right side-wall ducts 46, 68 are provided on the rear-wall surfaces 212b, 215b of the left and right second seal sections 212, 215, but the present invention is not limited to this configuration. For example, it is also possible to provide the front wall surfaces 212c, 215c of the left and right second seal sections 212, 215 with reinforcing second ribs that connect respectively to the left and right side-wall ducts 46, 68.

Furthermore, in Embodiments 1 and 2, examples were described in which pluralities of left and right first ribs 91, 93 and left and right second ribs 213, 216 are respectively provided, but the present invention is not limited to these configurations, and it is also possible to provide only one of each of the left and right first ribs 91, 93 and the left and right second ribs 213, 216.

In Embodiment 1, an example was described in which the left and right side-wall ducts 46, 68 and the left and right first seal sections 47, 69 are formed from a rubber material, but the present invention is not limited to this example, and it is also possible to form these members from a resin or another material.

In Embodiment 2, an example was described in which the left and right second seal sections 212, 215 are formed from a rubber material, but the present invention is not limited to this example, and these members can also be formed from a resin or another material.

Furthermore, in Embodiments 1 and 2, examples were described in which the left and right side-wall duct units 41, 42 and the top and bottom ducts 43, 44 are formed from separate members, but the present invention is not limited to these examples, and the left and right side-wall duct units 41, 42 and top and bottom ducts 43, 44 can also be formed integrally from rubber, resin, or the like.

The equipment to be cooled 16, the radiator 31, the condenser 32, the left side-wall duct 46, the left first seal section 47, the right side-wall duct 68, the right first seal section 69, the left first ribs 91, the right first ribs 93, the left second seal section 212, the left second ribs 213, the right second seal section 215, the right second ribs 216, and other components presented in Embodiments 1 and 2 are not limited to the shapes and configurations therein and suitable modifications can be made.

Embodiment 3

Figure 16:
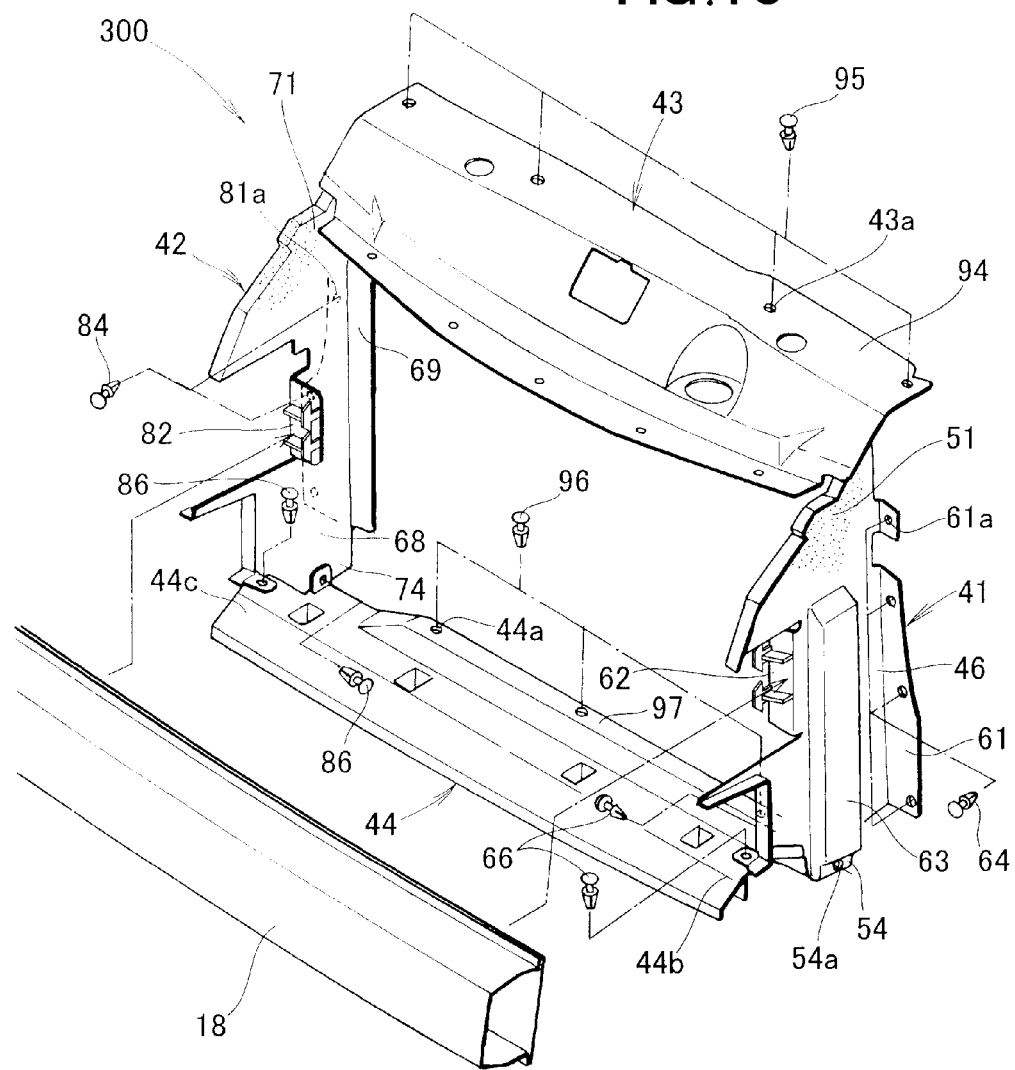
FIG. 16 is a perspective view showing an air guide duct structure according to Embodiment 3.

Next, an air guide duct structure 300 of Embodiment 3 is described based on FIG. 16 onward. In the air guide duct structure 300 of Embodiment 3, the left and right bumper attachment flaps for attaching the front bumper beam 18 are improved over those of the left and right side-wall ducts 46, 68 constituting the air guide duct structure 20 of Embodiment 1. Consequently, in describing the air guide duct structure of Embodiment 3, the other structural elements of the air guide duct structure are the same as those of Embodiment 1, and the same structural elements are therefore denoted by the same reference numerals and detailed descriptions thereof are omitted.

Figure 17:
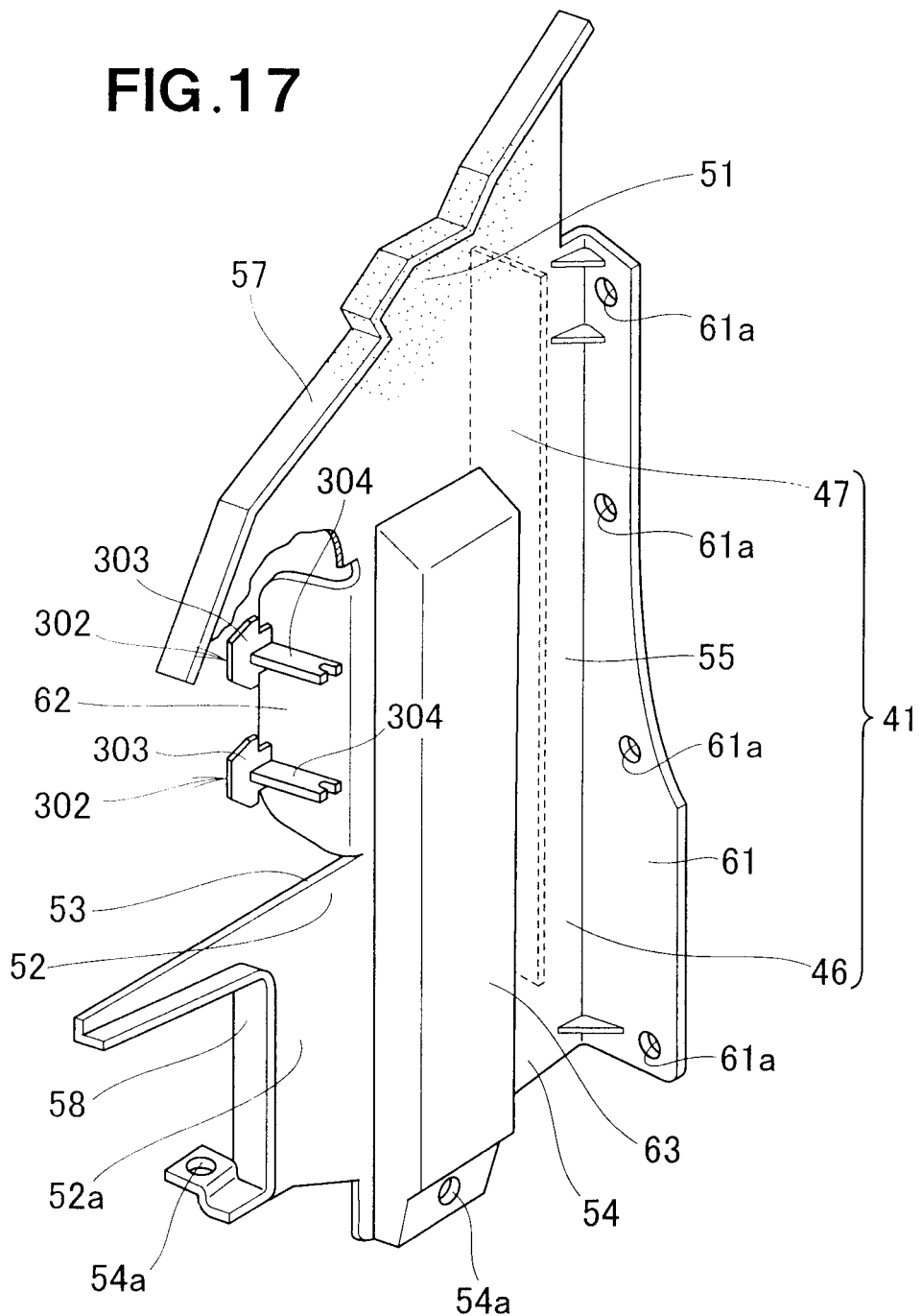
FIG. 17 is a perspective view of a left side-wall duct unit shown in FIG. 16.

The left side-wall duct unit 41 is a member formed from a rubber material, comprising a left side-wall duct (a side-wall duct) 46 provided on the left side of equipment to be cooled 16 (FIG. 1) and a left seal section 47 provided on the left side-wall duct 46, as shown in FIGS. 16 and 17. An olefin-based thermoplastic elastomer (TPO, i.e. Thermoplastic olefin) is used as an example of the rubber material. At room temperature, the thermoplastic elastomer has the characteristics of rubber, and at high temperatures, the thermoplastic elastomer has the characteristics of softening and becoming able to be compressed, extruded, injected, and otherwise handled similar to thermoplastics. Consequently, by softening the thermoplastic elastomer at a high temperature, the left side-wall duct unit 41 can be easily molded.

The left side-wall duct 46 is a plate-shaped member that extends in the vehicle longitudinal direction and guides air from the front of the vehicle as cooling air (traveling air) to the equipment to be cooled 16 (FIG. 1). The top part 51 of the left side-wall duct 46 is inclined downward toward the front of the vehicle. An accommodating concavity 53 is formed in a front part 52 of the left side-wall duct 46. A bottom part 54 of the left side-wall duct 46 is formed to be substantially horizontal, and a rear part 55 is formed to be substantially vertical. The accommodating concavity 53 is a recession formed into a substantial U shape in order to accommodate the front bumper beam 18 (FIG. 1).

The left side-wall duct 46 further has a top bent piece 57 bent toward the outside of the vehicle from the top part 51, a front bent piece 58 bent toward the outside of the vehicle from the front bottom half 52a, a stay attachment piece 61 bent toward the outside of the vehicle from the rear part 55, a left bumper attachment flap (an attachment flap) 62 bent toward the inside of the vehicle from the accommodating concavity 53, and a pair of left interlocking parts (interlocking parts) 302 provided on the left bumper attachment flap 62.

The left side-wall duct 46 has a bulging part 63 approximately in the center. The bulging part 63 is a region made to bulge toward the outside of the vehicle in order to accommodate a receiver tank 33 (FIG. 5). The receiver tank 33 temporarily stores refrigerant that has been liquefied in the condenser 32.

By forming the top bent piece 57, the front bent piece 58, the stay attachment piece 61, the left bumper attachment flap 62, and the bulging part 63 in the left side-wall duct 46, the rigidity of the left side-wall duct 46 is increased.

A plurality of stay attachment holes 61a are formed in the stay attachment piece 61. This stay attachment piece 61 is attached to the left stay 25 (see FIGS. 1 and 5) by stay clips 64 inserted into the stay attachment holes 61a.

The left bumper attachment flap 62 is provided so as to be substantially orthogonal to the longitudinal direction of the left side-wall duct 46, i.e. to the side wall of the left side-wall duct 46. The pair of left interlocking parts 302 is provided integrally to the left bumper attachment flap 62 at predetermined vertical intervals. A left interlocking part 102 is formed from a rubber material.

Figure 18:
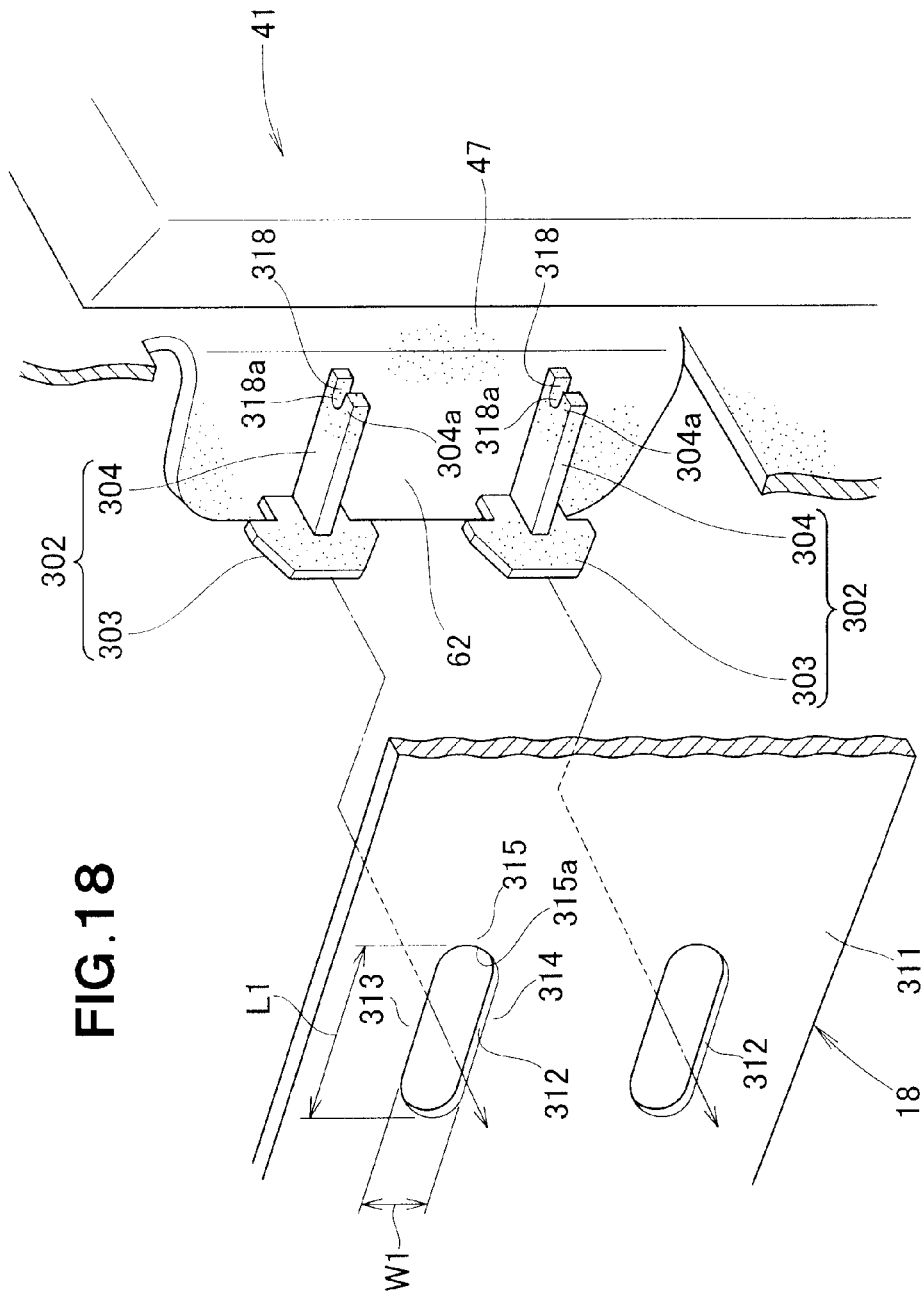
FIG. 18 is an exploded perspective view showing a state in which oblong holes of the vehicle body are disengaged from left interlocking parts of the left side-wall duct shown in FIG. 2.
Figure 19:
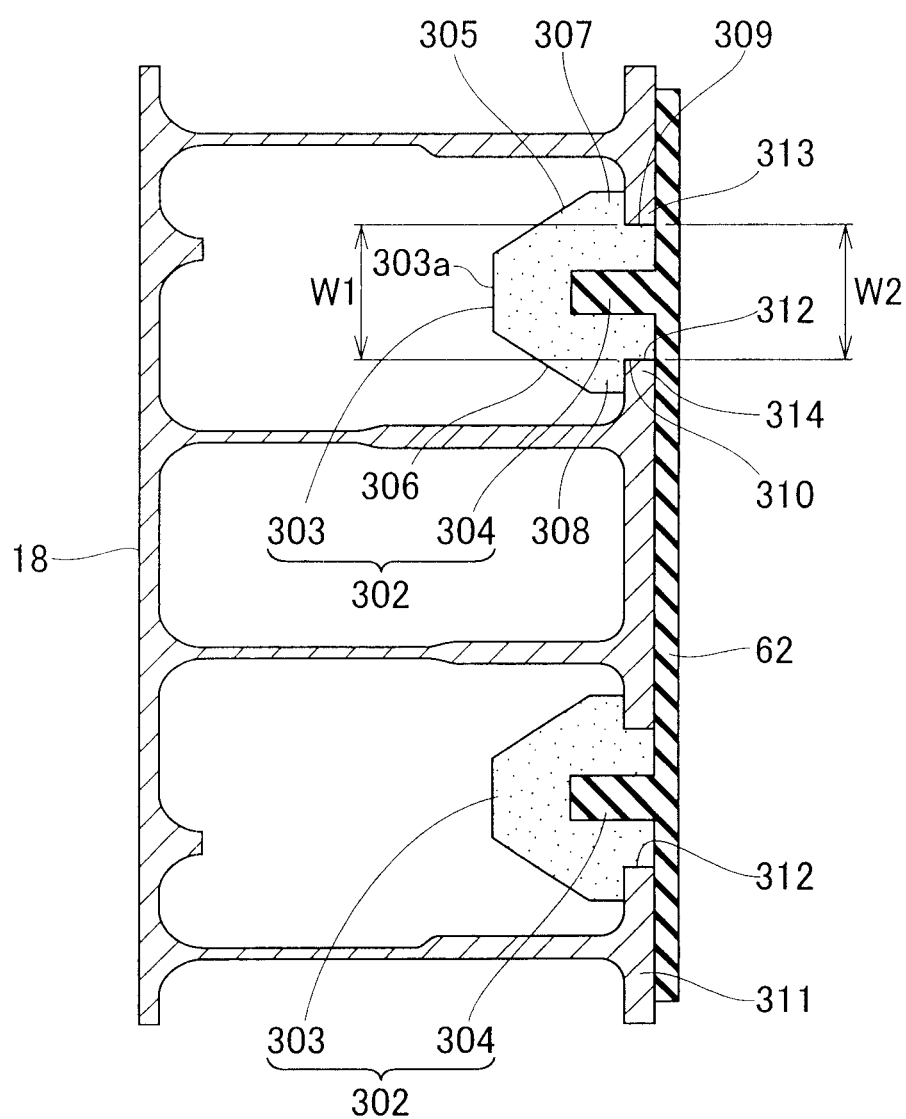
FIG. 19 is a cross-sectional view showing a state in which the left interlocking parts shown in FIG. 18 are interlocked with the oblong holes of the vehicle body.

The left interlocking parts 302 integrally comprise longitudinal interlocking parts (vertical interlocking parts) 303 that can interlock with top and bottom areas 313, 314 of top and bottom oblong holes 312, 312 formed in the front bumper beam 18, and transverse interlocking parts (horizontal interlocking parts) 304 that can interlock with longitudinal end areas (end areas) 315 of the oblong holes 312, as shown in FIGS. 18 and 19.

The oblong holes 312 are formed in the rear wall part (the vehicle body side) 311 of the front bumper beam 18 so as to constitute a top and bottom pair in the region near the left end and a top and bottom pair in a region near the right end. The pair of left interlocking parts 302 of the left bumper attachment flap 62 interlocks with the pair of oblong holes 312 in the region near the left end.

The oblong holes 312 are interlocking holes that extend in the vehicle width direction, and are designed with a hole length dimension L1 in the vehicle width direction and a hole width dimension W1. A pair of right interlocking parts (interlocking parts) 322 of the right bumper attachment flap (an attachment flap) 82 shown in FIG. 20 interlock with oblong holes (not shown) in the region near the right end.

The longitudinal interlocking parts 303 project out from the left bumper attachment flap 62 toward the front of the vehicle body. The longitudinal interlocking parts 303 have top and bottom inclined parts 305, 306 formed so as to gradually separate rearward away from the distal ends 303a, top projecting parts 307 provided behind the top inclined parts 305, top interlocking ridges 309 provided behind the top projecting parts 307, bottom projections 308 provided behind the bottom inclined parts 306, and bottom interlocking ridges 310 provided behind the bottom projections 308.

The top interlocking ridges 309 and the bottom interlocking ridges 310 are each spaced from each other by a distance W2. This distance W2 is designed to be slightly smaller than the hole width dimension W1 of the oblong holes 312. The top interlocking ridges 309 of the longitudinal interlocking parts 303 interlock with the top areas 313 of the oblong holes 312, and the bottom interlocking ridges 310 interlock with the bottom areas 314 of the oblong holes 312.

Figure 21:
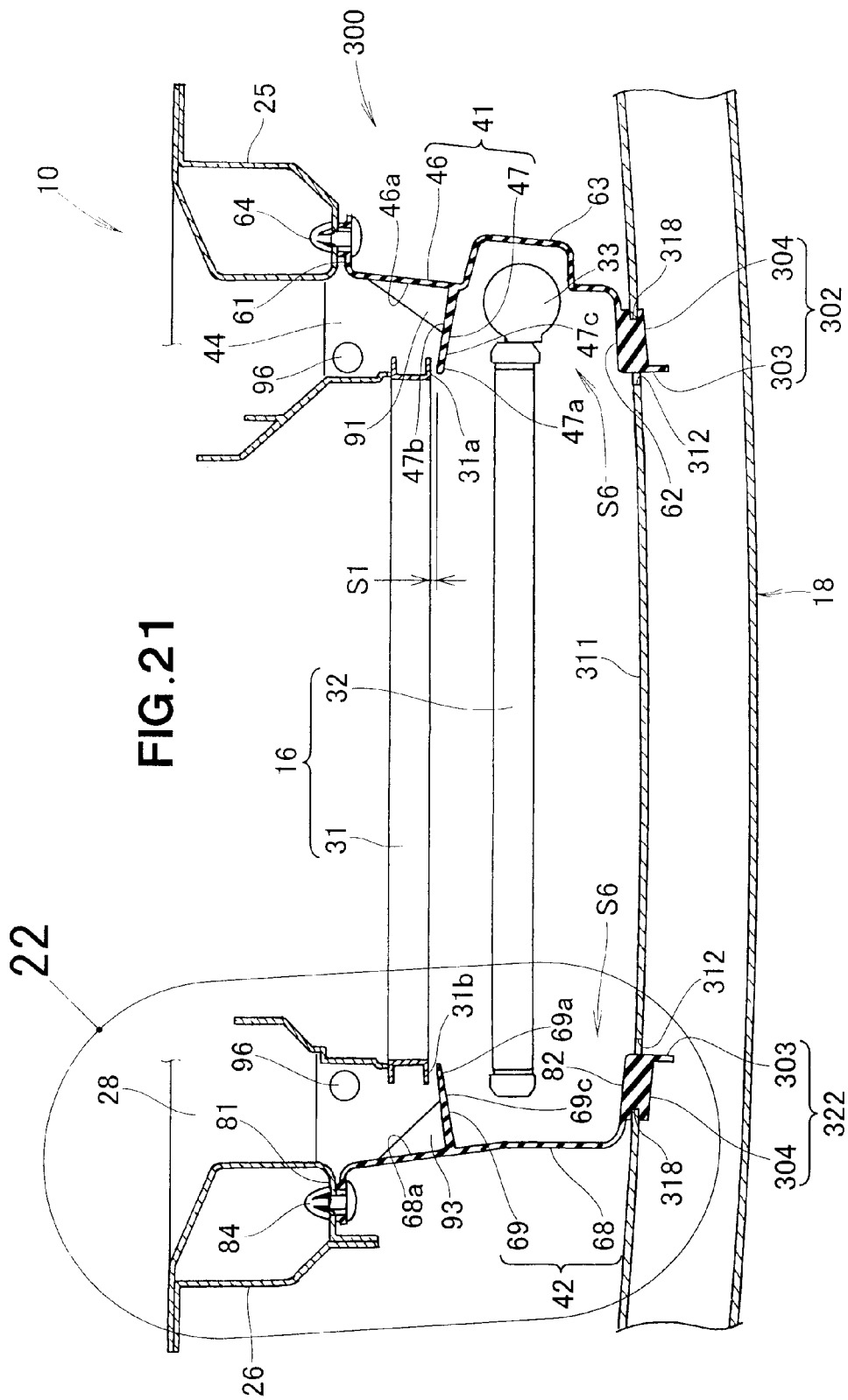
FIG. 21 is a cross-sectional view equivalent to FIG. 5 of Embodiment 1, showing the air guide duct structure according to Embodiment 3.

The transverse interlocking parts 304 extend outward in the vehicle width direction from the longitudinal interlocking parts 303 and project toward the front of the vehicle body from the left bumper attachment flap 62, and interlocking grooves 318 are formed in the outer end parts 304a. The interlocking grooves 318 of the transverse interlocking parts 304 interlock with the longitudinal end areas 315 of the oblong holes 312, and bottom parts 318a of the interlocking grooves 318 interlock with side edges 315a of the longitudinal end areas 315 (see FIG. 21 as well).

The front bumper beam 18 can be attached to the left bumper attachment flap 62 by interlocking the pair of top and bottom left interlocking parts 302 with the pair of top and bottom oblong holes 312. Consequently, the left side-wall duct unit 41 can be attached to the rear wall part 311 of the front bumper beam 18 without providing the left side-wall duct 46 with the slits that were provided conventionally. The slits can thereby be removed from the left side-wall duct 46.

Furthermore, the left bumper attachment flap 62 can be reliably attached to the rear wall part 311 by interlocking the interlocking grooves 318 of the transverse interlocking parts 304 with the longitudinal end areas 315 of the oblong holes 312. Furthermore, the left bumper attachment flap 62 can be more reliably attached to the rear wall part 311 by interlocking the bottom parts 318a of the interlocking grooves 318 with the side edges 315a of the longitudinal end areas 315.

The left side-wall duct 46 has a plurality of duct attachment holes 54a formed in the bottom part 54, as shown in FIG. 17. The bottom part 54 is attached to the left end 44b (FIG. 16) of the bottom duct 44 by the duct clips 66 inserted into each of the duct attachment holes 54a.

As described above, the left side-wall duct 46 is attached by the clips 64, 66 to the left stay 25 and the bottom duct 44, and is also attached to the front bumper beam 18 by the left interlocking part 102. The left side-wall duct 46 is thereby disposed to the left in the vehicle width direction of the radiator 31 and the condenser 32 (see FIGS. 1 and 21).

The left seal section 47 is an elastically deformable rubber member projecting substantially in the vehicle width direction out toward the left side-edge front surface (the side-edge front surface) 31a of the radiator 31 from the inner wall surface 46a of the left side-wall duct 46, as shown in FIG. 17.

Figure 20:
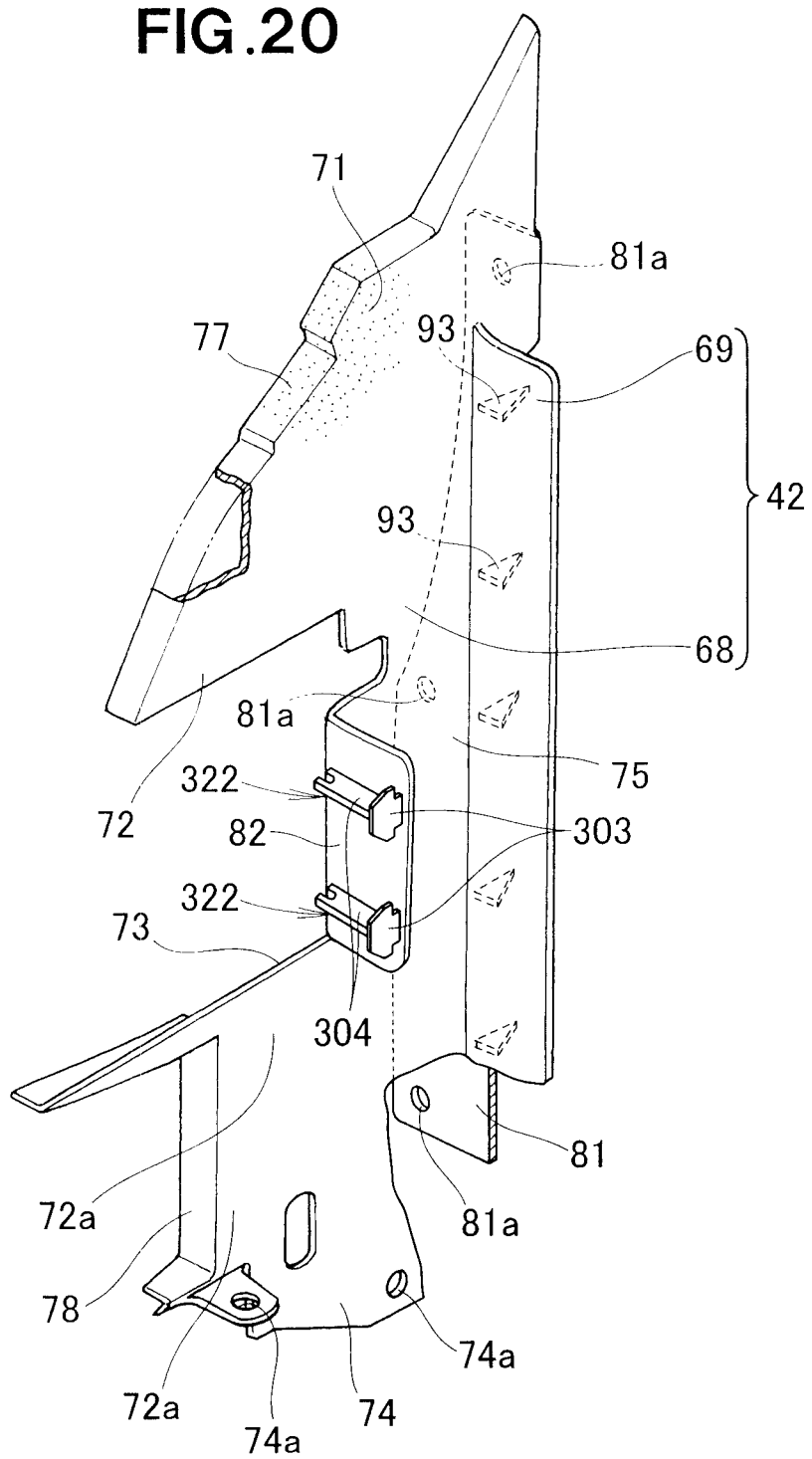
FIG. 20 is a perspective view of a the right side-wall duct unit shown in FIG. 16.

The right side-wall duct unit 42, similar to the left side-wall duct unit 41, is formed from a rubber material as shown in FIGS. 16 and 20. The right side-wall duct unit 42 comprises a right side-wall duct (a side-wall duct) 68 provided on the right side of the equipment to be cooled 16 (see FIG. 1), and a right seal section 69 provided on the right side-wall duct 68.

An olefin-based thermoplastic elastomer (TPO, i.e. thermoplastic olefin) or the like is used as an example of the rubber material, similar to the left side-wall duct unit 41. Consequently, as with the left side-wall duct unit 41, by softening the thermoplastic elastomer at a high temperature, the right side-wall duct unit 42 can be easily molded.

The right side-wall duct 68 is a member that is bilaterally symmetric with the left side-wall duct 46, and a detailed description is omitted. The right side-wall duct 68 has a top bent piece 77 bent toward the outside of the vehicle from the top part 71, a front bent piece 78 bent toward the outside of the vehicle from the front bottom half 72a, a stay attachment piece 81 bent toward the outside of the vehicle from the rear part 75, a right bumper attachment flap 82 bent toward the inside of the vehicle from the accommodating concavity 73, and a pair of right interlocking parts 322 provided on the right bumper attachment flap 82.

The pair of right interlocking parts 322 is integrally provided on the right bumper attachment flap 82 at predetermined vertical intervals. Specifically, the right interlocking parts 322 are formed from a rubber material.

The right interlocking parts 322 on the right side provided on the right bumper attachment flap 82 are bilaterally symmetric with the left interlocking parts 302 provided on the left bumper attachment flap 62, and the structural members are denoted by the same symbols as the left interlocking parts 302 and descriptions thereof are omitted.

The pair of top and bottom right interlocking parts 322 provided on the right bumper attachment flap 82 interlock with the pair of top and bottom oblong holes 312, whereby the right bumper attachment flap 82 can be attached to the front bumper beam 18, similar to the left bumper attachment flap 62. Consequently, the right side-wall duct unit 42 can be attached to the front bumper beam 18 without providing the right side-wall duct 68 with the slits that were provided conventionally. The slits can thereby be removed from the right side-wall duct 68.

As described above, the right side-wall duct 68 is attached to the right stay 26 and the bottom duct 44 by the clips 84, 86, and is attached to the front bumper beam 18 by the right interlocking parts 322. The right side-wall duct 68 is thereby disposed on the right in the vehicle width direction of the radiator 31 and the condenser 32 (see FIGS. 1 and 21).

Thus, by providing the left and right side-wall ducts 46, 68 on the left and right sides of the radiator 31 and the condenser 32, air in front of the vehicle can be guided as cooling air (traveling air) to the radiator 31 and the condenser 32 (the equipment to be cooled 16) by the left and right side-wall ducts 46, 68. The slits are not formed in the left and right side-wall ducts 46, 68, as previously described. Consequently, the cooling air (the traveling air) can be hindered from flowing to the outsides of the left and right side-wall ducts 46, 68 through slits. The cooling air can thereby be guided efficiently to the equipment to be cooled 16 by the left and right side-wall ducts 46, 68.

Figure 22:
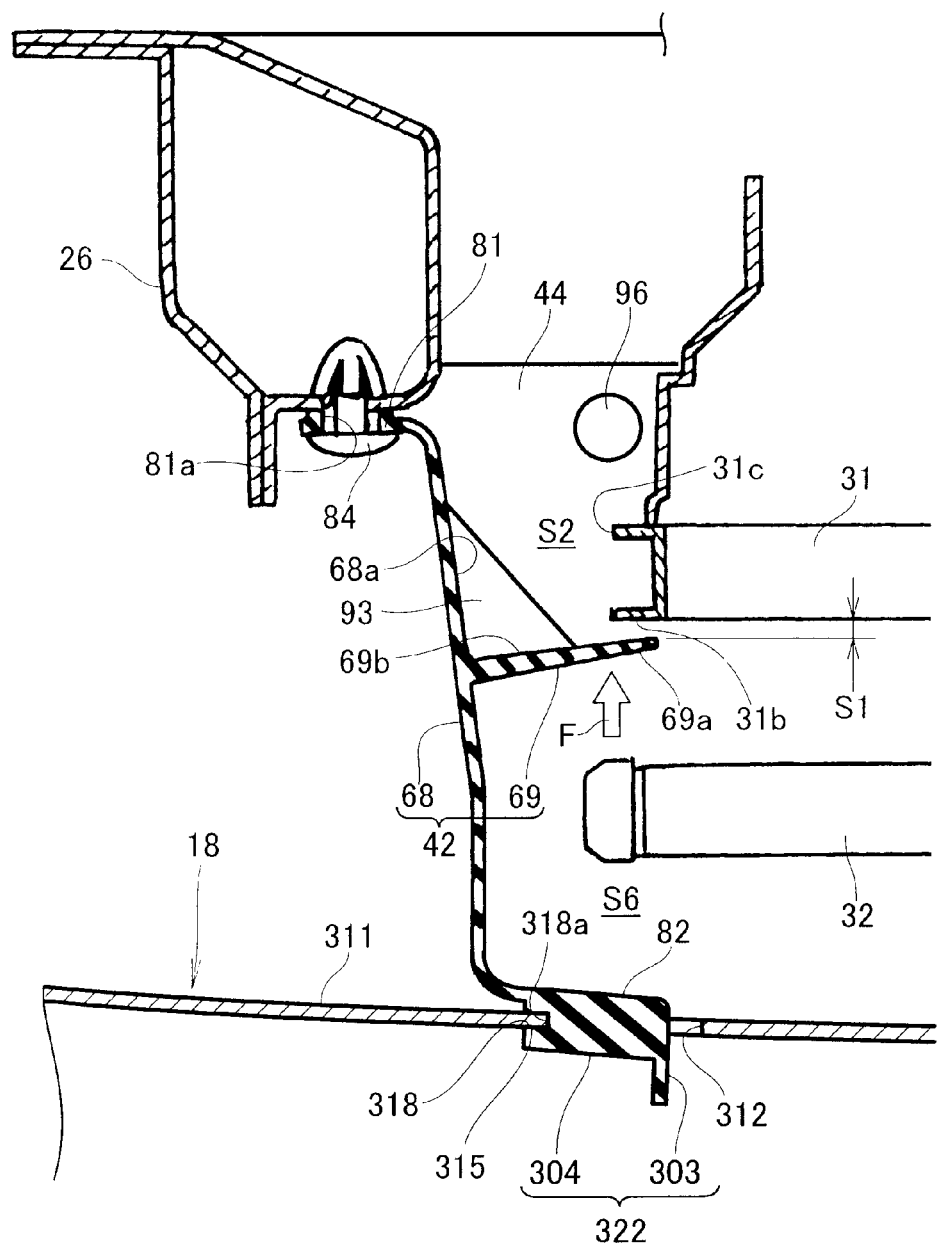
FIG. 22 is an enlarged cross-sectional view of an area indicated by 22 in FIG. 21.

Furthermore, the left interlocking parts 302 are provided integrally on the left bumper attachment flap 62, and the right interlocking parts 322 are provided integrally on the right bumper attachment flap 82. Consequently, compared with cases in which the left and right bumper attachment flaps 62, 82 are attached to the front bumper beam 18 using clips that are separate members from the left and right bumper attachment flaps 62, 82, for example, the left and right operating spaces S6 (see FIGS. 21 and 22) can be kept small. The left and right bumper attachment flaps 62, 82 can thereby be easily attached to the front bumper beam 18 even when the left and right operating spaces S6 are small.

Figure 23A:
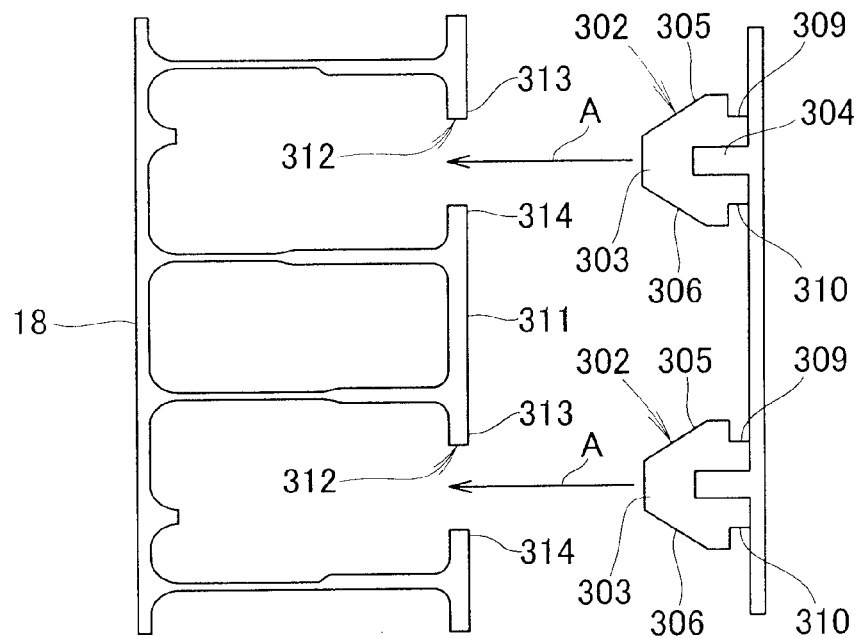
FIG. 23A is a view showing a state before longitudinal interlocking sections of the left interlocking parts shown in FIG. 19 interlock with the oblong holes.
Figure 23B:
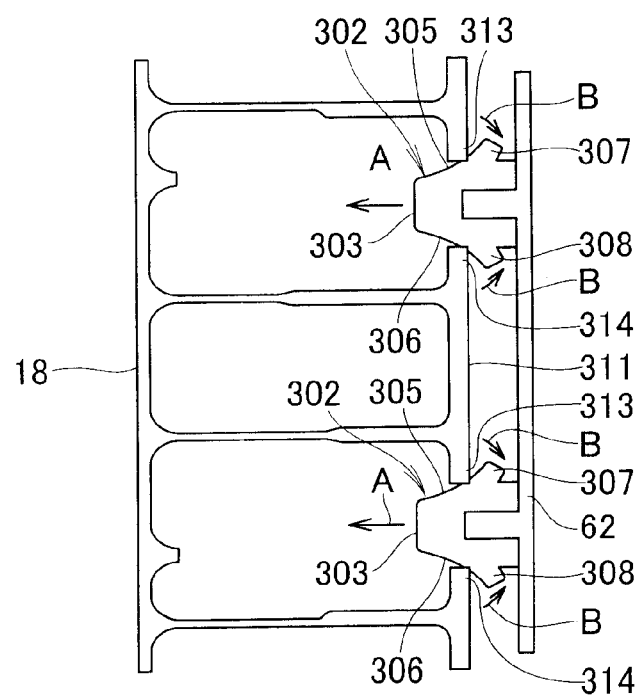
FIG. 23B is a view showing a state in which the longitudinal interlocking sections are being inserted into the oblong holes from the state of FIG. 23A.
Figure 23C:
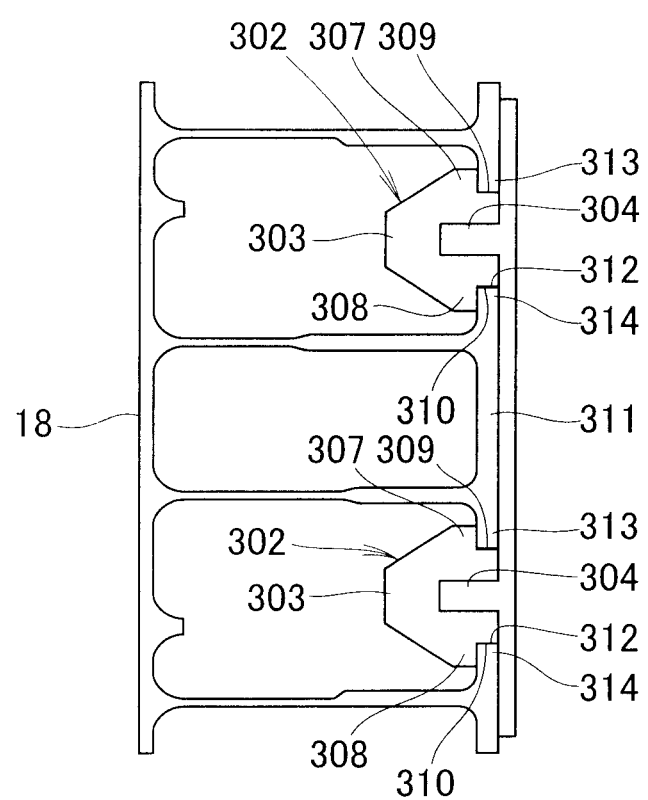
FIG. 23C is a view showing a state in which the longitudinal interlocking sections have been interlocked in the oblong holes from the state of FIG. 23B.

Next, an example of attaching the left bumper attachment flap 62 to the front bumper beam 18 is described based on FIGS. 23A to 23C.

The left interlocking parts 302 of the left bumper attachment flap 62 are inserted as shown by the arrows A into the oblong holes 312 of the front bumper beam 18 (specifically, the rear wall part 311), as shown in FIG. 23A.

The top inclined parts 305 of the left interlocking parts 302 come in contact with the top areas 313 of the oblong holes 312 as shown in FIG. 23B, and the bottom inclined parts 306 of the left interlocking parts 302 come in contact with the bottom areas 314 of the oblong holes 312. In this state, the left interlocking parts 302 continue to be inserted as shown by the arrows A into the oblong holes 312, whereby the top projecting parts 307 are compressed by the top areas 313 as shown by the arrows B, and the bottom projections 308 are compressed by the bottom areas 314 as shown by the arrows B.

From this state, the left interlocking parts 302 are inserted further as shown by the arrows A, whereby the top projecting parts 307 breach the top areas 313 to be positioned toward the front of the vehicle body from the rear wall part 311, and the bottom projections 308 breach the bottom areas 314 to be positioned toward the front of the vehicle body from the rear wall part 311.

The top projecting parts 307 revert from being compressed after having breached the top areas 313, and the bottom projections 308 revert from being compressed after having breached the bottom areas 314, as shown in FIG. 23C. The reverting of the top projecting parts 307 causes the top interlocking ridges 309 to interlock with the top areas 313 of the oblong holes 312, and the reverting of the bottom projections 308 causes the bottom interlocking ridges 310 to interlock with the bottom areas 314 of the oblong holes 312.

Next, an example of the transverse interlocking parts 304 of the left interlocking parts 302 interlocking with the oblong holes 312 is described based on FIG. 24.

The left interlocking parts 302 of the left bumper attachment flap 62 are inserted as shown by arrow A into the oblong holes 312 of the front bumper beam 18 (specifically, the rear wall part 311), as shown in FIG. 24(a).

The outer end parts 304a of the transverse interlocking parts 304 come in contact with the longitudinal end areas 315 (specifically, the side edges 115a) of the oblong holes 312 as shown in FIG. 24(b). Consequently, the left side-wall duct 46 elastically deforms and the left interlocking parts 302 move inward in the vehicle width direction as shown by arrow C. In this state, the left interlocking parts 302 continue to be inserted into the oblong holes 312 as shown by arrow A, whereby the front-side regions 304b of the outer end parts 304a breach the longitudinal end areas 315.

The front-side regions 304b of the outer end parts 304a breach the longitudinal end areas 315 as shown in FIG. 24(c), whereby the left side-wall duct 46 reverts from being elastically deformed and the left interlocking parts 302 move outward in the vehicle width direction in the direction of arrow D. The left interlocking parts 302 moving outward in the vehicle width direction causes the interlocking grooves 318 to interlock with the longitudinal end areas 315 and the bottom parts 318a of the interlocking grooves 318 to interlock with the side edges 315a of the longitudinal end areas 315.

Due to the interlocking of the top and bottom interlocking ridges 309, 310 of the longitudinal interlocking parts 303 with the top and bottom areas 313, 314 of the oblong holes 312, as well as the interlocking of the interlocking grooves 318 of the transverse interlocking parts 304 with the longitudinal end areas 315 of the oblong holes 312, as shown in FIGS. 23 and 24, the left interlocking parts 302 interlock with the oblong holes 312 and the left bumper attachment flap 62 is attached to the front bumper beam 18.

The air guide duct structure 300 according to Embodiment 3 is not limited to the example previously described; suitable modifications, improvements, and other changes can be made. For example, in Embodiment 3, an example was described in which the interlocking grooves 318 of the transverse interlocking parts 304 interlock with the longitudinal end areas 315 of the oblong holes 312, but the present invention is not limited to this example, and the interlocking grooves 318 may interlock with the inside areas of the oblong holes 312.

The left interlocking parts 302, the rear wall part 311 of the front bumper beam, the oblong holes 312, the top areas 313 of the oblong holes, the bottom areas 314 of the oblong holes, the longitudinal end areas 315, the side edges 315a, the right interlocking parts 322, and other components presented in Embodiment 3 are not limited to the shapes and configurations therein; suitable modifications can be made.

INDUSTRIAL APPLICABILITY

The present invention is suitable for application in an automobile comprising a vehicle air guide duct structure which is provided on the left and right sides of equipment to be cooled for guiding air in front of the vehicle as cooling air (traveling air) to the equipment to be cooled.

REFERENCE SIGNS LIST

10: Vehicle body front structure
14: Front bulk head
16: Equipment to be cooled
18: Front bumper beam
20, 210: Air guide duct structure
31: Radiator
31a, 32a: Left side-edge front surface (side-edge front surface)
31b, 32b: Right side-edge front surface (side-edge front surface)
32: Capacitor
46: Left side-wall duct (side-wall duct)
46a: Inner wall surface of left side-wall duct
47: Left first seal section (seal section)
47b, 69b, 212b, 215b: Rear wall surface
47c, 69c, 212c, 215c: Front wall surface
68: Right side-wall duct (side-wall duct)
68a: Inner wall surface of right side-wall duct
69: Right first seal section (seal section)
91: Left first rib (rib)
93: Right first rib (rib)
212: Left second seal section (seal section)
213: Left second rib (rib)
215: Right second seal section (seal section)
216: Right second ribs (ribs)
S1, S3: Predetermined distance

The invention claimed is:

1. A vehicle air guide duct structure comprising:
   left and right side-wall ducts provided on left and right sides of an equipment to be cooled and extending in a longitudinal direction of a vehicle body for guiding air in front of a vehicle as cooling air to the equipment to be cooled;
   elastically deformable left and right seal sections projecting outward from respective inner wall surfaces of the left and right side-wall ducts toward side-edge front surfaces of the equipment to be cooled, the seal sections extending up to the side-edge front surfaces while being separated by a predetermined distance from the side-edge front surfaces toward a front of the vehicle;
   a plurality of reinforcing ribs provided on a front wall surface or a rear wall surface of each of the left and right seal sections except a distal end part of each seal section, the reinforcing ribs having a substantially triangular shape and connecting the front wall surface or the rear wall surface of each of the seal sections to the inner wall surface of a corresponding one of the left and right side-wall ducts;
   wherein each of the side-wall ducts and a corresponding one of the seal sections are formed from a single-piece rubber material,
   wherein the reinforcing ribs provide each of the seal sections with a rigidity such that, when subjected to a traveling air pressure while the vehicle is traveling, the seal sections undergo elastic deformation and come into contact with the side-edge front surfaces, and when the vehicle is idling, the distal end parts of the seal sections remain separated from the side-edge front surfaces, and wherein the side-wall ducts have:
    attachment flaps projecting in a direction substantially orthogonal to a direction in which the side-wall ducts extend; and
    interlocking parts provided on the attachment flaps, wherein the interlocking parts have longitudinal interlocking parts capable of interlocking with top and bottom areas of oblong holes provided on the sides of the vehicle body and extending in the vehicle width direction.

2. The air guide duct structure of claim 1, wherein the interlocking parts have transverse interlocking parts that interlock with longitudinal end areas of the oblong holes.

3. The air guide duct structure of claim 2, wherein the transverse interlocking parts interlock with edges of the longitudinal end areas.

4. The air guide duct structure of claim 1, further comprising:
    a top duct made of a hard resin and provided on a top side of the equipment to be cooled; and
    a bottom duct made of a hard resin and provided on a bottom side of the equipment to be cooled;
    wherein bottom end parts of the left and right side-wall ducts are both attached to the bottom duct.

5. The air guide duct structure of claim 1, wherein the attachment flaps are substantially orthogonal to the respective side walls of the left and right side-wall ducts; and both of the attachment flaps are attached to a front bumper beam.

6. The air guide duct structure of claim 4, wherein the bottom duct and the left and right side-wall ducts have attachment holes formed in the respective bottom end parts, and clips are fitted into each of the attachment holes, whereby the bottom end parts of the left and right side-wall ducts are attached to the bottom duct by the clips.

7. The air guide duct structure of claim 1, wherein the air guide duct structure is provided between a front bumper beam which supports a front bumper face and a front bulk head which supports the equipment to be cooled;
    the left and right side-wall ducts are composed of a rubber material extending in the longitudinal direction of the vehicle body;
    a bottom duct made of a hard resin is provided on a bottom side of the equipment to be cooled; and
    bottom end parts of the left and right side-wall ducts are both attached to the bottom duct.

8. The air guide duct structure of claim 7, wherein the bottom duct has a collision energy-absorbing structure for absorbing collision energy.

9. The air guide duct structure of claim 1, wherein each of the oblong holes defines a hole length dimension and a hole width dimension, the hole length dimension being greater than the hole width dimension, wherein the longitudinal interlocking parts include top interlocking ridges and bottom interlocking ridges that are spaced from one another by a distance that is less than the hole width dimension of the oblong holes.

10. The air guide duct structure of claim 1, the left and right side-wall ducts each including a top part and a bottom part extending in a direction generally orthogonal to the attachment flap of the respective left and right side-wall duct, wherein the attachment flaps are rectangular in shape and at least a portion of the attachment flaps is vertically disposed between the top part and the bottom part of the respective left and right side-wall duct.

11. A vehicle air guide duct structure comprising:
    left and right side-wall ducts provided on left and right sides of an equipment to be cooled and extending in a longitudinal direction of a vehicle body for guiding air in front of a vehicle as cooling air to the equipment to be cooled; and
    elastically deformable left and right seal sections projecting outward from respective inner wall surfaces of the left and right side-wall ducts toward side-edge front surfaces of the equipment to be cooled, the seal sections extending up to the side-edge front surfaces while being separated by a predetermined distance from the side-edge front surfaces toward a front of the vehicle;
    wherein the seal sections undergo elastic deformation and come into contact with the side-edge front surfaces when subjected to a traveling air pressure while the vehicle is traveling, and
    wherein the side-wall ducts have:
        attachment flaps projecting in a direction substantially orthogonal to a direction in which the side-wall ducts extend;
        interlocking parts provided on the attachment flaps, wherein the interlocking parts have longitudinal interlocking parts capable of interlocking with top and bottom areas of oblong holes provided on sides of the vehicle body and extending in the vehicle width direction,
    wherein the left and right side-wall ducts are composed of a rubber material extending in the longitudinal direction of the vehicle body;
    a bottom duct made of a hard resin and provided on a bottom side of the equipment to be cooled; and
    the left and right side-wall ducts having respective bottom end parts both attached to the bottom duct,
    wherein the bottom duct has a collision energy-absorbinq structure for absorbing collision energy, and
    wherein the bottom duct comprises:
    a rear end part attached to the front bulk head;
    an inclined part which projects at an upward incline toward the front of the vehicle body from the rear end part; and
    a substantially horizontal part which projects toward the front of the vehicle body from the inclined part;
    wherein the inclined part and the horizontal part are made to have a low rigidity and thereby form the collision energy-absorbing structure;
    a front end part projects toward the front of the vehicle body from the horizontal part, the front end part being provided with reinforcing ribs and made to have a high rigidity; and
    the front bumper face is supported by the highly rigid front end part.

* * * * *